United States Patent
Kojima

(10) Patent No.: US 12,181,336 B2
(45) Date of Patent: Dec. 31, 2024

(54) OPTICAL FIBER SENSING SYSTEM, OPTICAL FIBER SENSING EQUIPMENT, AND UNDERGROUND ACTION MONITORING METHOD

(71) Applicant: NEC Corporation, Tokyo (JP)

(72) Inventor: Takashi Kojima, Tokyo (JP)

(73) Assignee: NEC CORPORATION, Tokyo (JP)

( * ) Notice: Subject to any disclaimer, the term of this patent is extended or adjusted under 35 U.S.C. 154(b) by 386 days.

(21) Appl. No.: 17/623,332

(22) PCT Filed: Jul. 5, 2019

(86) PCT No.: PCT/JP2019/026831
§ 371 (c)(1),
(2) Date: Dec. 28, 2021

(87) PCT Pub. No.: WO2021/005649
PCT Pub. Date: Jan. 14, 2021

(65) Prior Publication Data
US 2022/0390272 A1 Dec. 8, 2022

(51) Int. Cl.
*G01H 9/00* (2006.01)
*G06V 20/52* (2022.01)

(52) U.S. Cl.
CPC ............ *G01H 9/004* (2013.01); *G06V 20/52* (2022.01); *G06F 2218/12* (2023.01)

(58) Field of Classification Search
USPC .......................................................... 73/655
See application file for complete search history.

(56) References Cited

U.S. PATENT DOCUMENTS

| | | | |
|---|---|---|---|
| 9,000,918 B1 | 4/2015 | McLaughlin et al. | |
| 10,917,168 B2 * | 2/2021 | Huang | H04B 10/071 |
| 10,931,366 B2 * | 2/2021 | Wang | G01D 5/35361 |
| 2012/0130930 A1 * | 5/2012 | Klar | G01B 11/16 |
| | | | 356/450 |
| 2015/0033865 A1 | 2/2015 | Rollinger | |
| 2016/0086459 A1 | 3/2016 | Puzrin et al. | |

FOREIGN PATENT DOCUMENTS

| | | | | |
|---|---|---|---|---|
| CH | 2846316 A1 * | 3/2015 | | G01D 5/353 |
| CN | 1844641 A * | 10/2006 | | |
| CN | 101271529 A * | 9/2008 | | |

(Continued)

OTHER PUBLICATIONS

JP Office Action for JP Application No. 2021-530348, mailed on Nov. 22, 2022 with English Translation.

(Continued)

*Primary Examiner* — Clayton E. LaBalle
*Assistant Examiner* — Warren K Fenwick
(74) *Attorney, Agent, or Firm* — Sughrue Mion, PLLC

(57) ABSTRACT

An optical fiber sensing system according to the present disclosure includes an optical fiber (10A) configured to detect a vibration in underground, an acquisition unit (21) configured to acquire, from the optical fiber (10A), an optical signal on which the vibration detected by the optical fiber (10A) is superimposed, and an identifying unit (22) configured to identify a suspicious action in the underground based on a vibration pattern included in the optical signal acquired by the acquisition unit (21).

12 Claims, 17 Drawing Sheets

(56) References Cited

FOREIGN PATENT DOCUMENTS

| | | | | | |
|---|---|---|---|---|---|
| CN | 202334749 | U | * | 7/2012 | |
| CN | 102685668 | A | * | 9/2012 | |
| CN | 103824406 | A | * | 5/2014 | |
| CN | 104599419 | A | | 5/2015 | |
| CN | 106706119 | A | * | 5/2017 | ............ G01H 17/00 |
| CN | 106875603 | A | | 6/2017 | |
| CN | 109427161 | A | | 3/2019 | |
| JP | 2005-345137 | A | | 12/2005 | |
| JP | 2008-234551 | A | | 10/2008 | |
| JP | 2009-122994 | A | | 6/2009 | |
| JP | 2016-532108 | A | | 10/2016 | |
| WO | 2014/170013 | A1 | | 10/2014 | |

OTHER PUBLICATIONS

Japanese Office Action for JP Application No. 2021-530348 mailed on Jul. 19, 2022 with English Translation.
International Search Report for PCT Application No. PCT/JP2019/026831, mailed on Jul. 30, 2019.

* cited by examiner

OPTICAL FIBER SENSING SYSTEM, OPTICAL FIBER SENSING EQUIPMENT, AND UNDERGROUND ACTION MONITORING METHOD

This application is a National Stage Entry of PCT/JP2019/026831 filed on Jul. 5, 2019, the contents of all of which are incorporated herein by reference, in their entirety.

TECHNICAL FIELD

The present disclosure relates to an optical fiber sensing system, optical fiber sensing equipment, and an underground action monitoring method.

BACKGROUND ART

Recently, illegal entries into a country by digging tunnels underground near a border with the country and crossing the border through the tunnels have become a problem. Therefore, it is required to find the tunnels.

For example, in the technique disclosed in Patent Literature 1, a plurality of vibration sensors are provided on an optical fiber installed in the underground. By detecting vibrations of the vibration sensors through oscillation of the optical fiber, the underground vibration associated with an activity related to a tunnel such as an activity to build a tunnel is detected.

CITATION LIST

Patent Literature

Patent Literature 1: Published Japanese Translation of PCT International Publication for Patent Application, No. 2016-532108

SUMMARY OF INVENTION

Technical Problem

However, in the technique disclosed in Patent Literature 1, since a vibration is detected for each vibration sensor, when a wide monitoring area such as a border is monitored, spacings between the vibration sensors become wide, and thus there may be a part of the monitoring area where a vibration cannot be detected. Thus, there is a possibility that a suspicious action such as tunnel digging in the underground may not be detected.

Further, the technique disclosed in Patent Literature 1 requires a special structure in which the vibration sensors are provided on the optical fiber. This increases the cost required for detecting suspicious actions such as tunnel digging in the underground.

Thus, an object of the present disclosure is to provide an optical fiber sensing system, optical fiber sensing equipment, and an underground action monitoring method, which solve the above-described problems and can inexpensively detect suspicious actions in the underground in a wide monitoring area.

Solution to Problem

In an example aspect, an optical fiber sensing system includes:

an optical fiber configured to detect a vibration in underground;

an acquisition unit configured to acquire, from the optical fiber, an optical signal on which the vibration detected by the optical fiber is superimposed; and an identifying unit configured to identify a suspicious action in the underground based on a vibration pattern included in the optical signal acquired by the acquisition unit.

In another example aspect, an optical fiber sensing equipment includes:

an acquisition unit configured to acquire an optical signal on which a vibration detected by an optical fiber is superimposed from the optical fiber for detecting the vibration in underground; and an identifying unit configured to identify a suspicious action in the underground based on a vibration pattern included in the optical signal acquired by the acquisition unit.

In another example aspect, an underground action monitoring method performed by an optical fiber sensing system includes:

detecting, by an optical fiber, a vibration in underground;

acquiring, from the optical fiber, an optical signal on which the vibration detected by the optical fiber is superimposed; and identifying a suspicious action in the underground based on a vibration pattern included in the optical signal acquired in the acquiring.

Advantageous Effects of Invention

According to the above example aspects, it is possible to achieve an effect of providing an optical fiber sensing system, optical fiber sensing equipment, and an underground action monitoring method, which solve the above-described problems and can inexpensively detect suspicious actions in the underground in a wide monitoring area.

DESCRIPTION OF EXAMPLE EMBODIMENTS

Example embodiments of the present disclosure will be described below with reference to the drawings. The following description and drawings are omitted and simplified as appropriate for the purpose of clarifying the description. In the following drawings, the same elements are denoted by the same reference signs, and repeated description thereof is omitted if necessary.

First Example Embodiment

First, a configuration example of an optical fiber sensing system according to a first example embodiment will be described with reference to FIG. 1.

Figure 1:
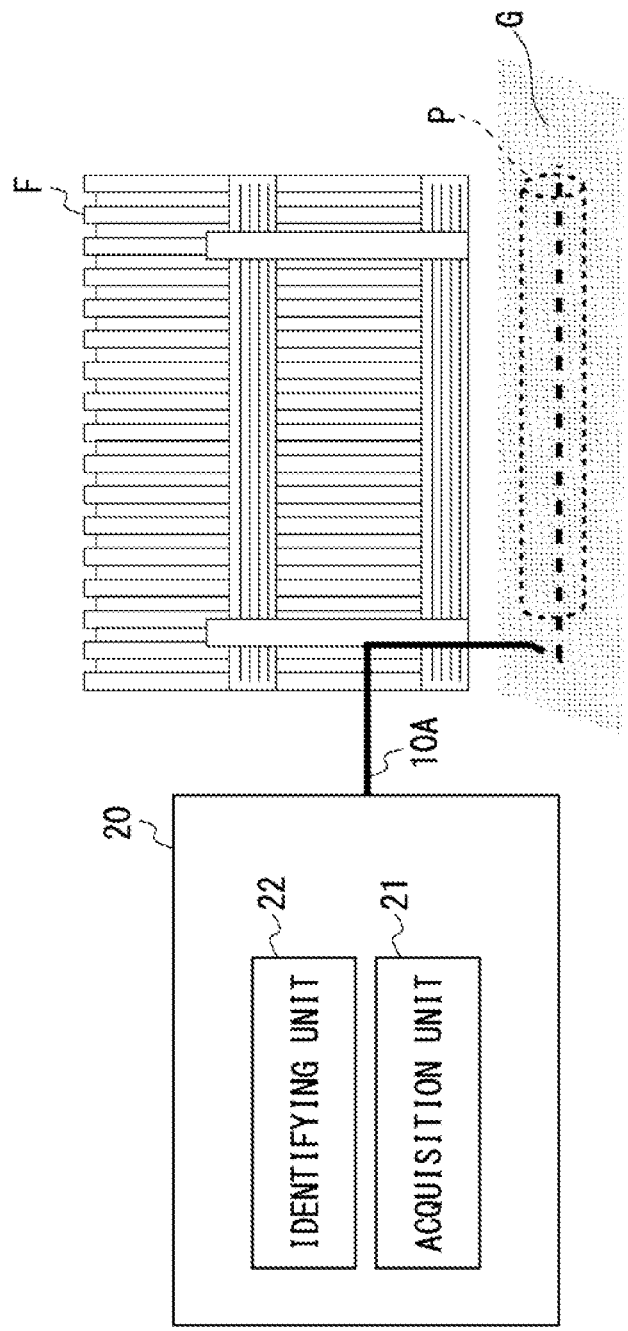
FIG. 1 shows a configuration example of an optical fiber sensing system according to a first example embodiment.

As shown in FIG. 1, the optical fiber sensing system according to the first example embodiment includes an optical fiber 10A and optical fiber sensing equipment 20. The optical fiber sensing equipment 20 includes an acquisition unit 21 and an identifying unit 22.

The optical fiber 10A is provided in underground G of a monitoring area, and one end thereof is connected to the optical fiber sensing equipment 20. The monitoring area is, for example, a border, the periphery of a facility, etc. The facility is, for example, a prison, a nursery school, an animal breeding facility, a theme park, an airport, etc. A fence F is provided in the monitoring area. The fence F is disposed, for example, along a border or around the facility which is the monitoring area.

The entire optical fiber 10A may be entirely laid in the underground G, laid on the ground, for example, by being laid on the fence F, or a part of the optical fiber 10A may be laid in the underground G, and the remaining part of the optical fiber 10A may be laid on the ground.

The optical fiber 10A is linearly disposed in the underground G along the fence F in a plane substantially horizontal to a ground surface. However, the present disclosure is not limited to this, and the optical fiber 10A may be disposed in the underground G so as to meander in a curved manner in a plane substantially horizontal to the ground surface.

The optical fiber 10A is stored inside a cable P provided in the underground G. However, the present disclosure is not limited to this, and the optical fiber 10A may be attached to an outer peripheral surface of the cable P, wound around the cable P, or disposed without using the cable P. When the optical fiber 10A is disposed without using the cable P, for example, the optical fiber 10A may be accommodated in a box installed in the underground G. The optical fiber 10A may be passed through inside a pipe provided in the underground G.

The acquisition unit 21 makes pulse light incident on the optical fiber 10A. The acquisition unit 21 receives, via the optical fiber 10A, reflected light and scattered light generated when the pulse light is transmitted through the optical fiber 10A as return light, i.e., an optical signal.

When any event occurs in the underground G, vibration and sound corresponding to the event are generated. Since a sound is a kind of a vibration, the term "vibration" will be described below as including a sound as well as a general vibration. The vibration corresponding to the event generated in the underground G is superimposed on the return light transmitted from the optical fiber 10A. Therefore, the optical fiber 10A can detect the vibration generated in the underground G.

Thus, when any event occurs in the underground G, the optical fiber 10A detects a vibration corresponding to the event and transmits the detected vibration superimposed on the return light, and the acquisition unit 21 acquires or receives the return light on which the vibration detected by the optical fiber 10A is superimposed. When only a part of the optical fiber 10A is disposed in the underground G, the acquisition unit 21 may acquire the return light on which the vibration detected by the part of the optical fiber 10A disposed in the underground G is superimposed.

Figure 2:
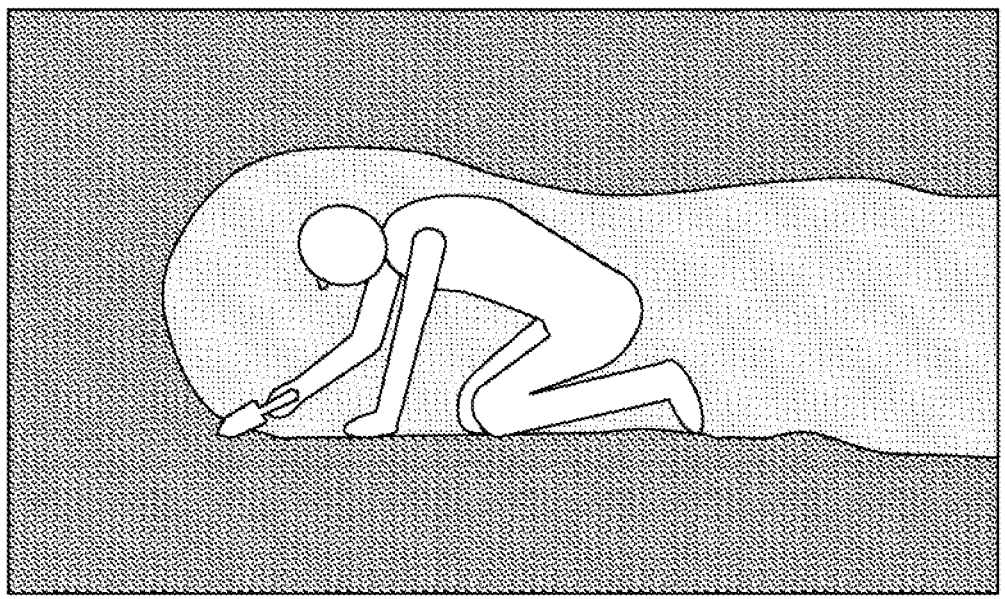
FIG. 2 shows an example of a suspicious action identified by the optical fiber sensing system according to the first example embodiment.

The return light on which the vibration is superimposed has a unique vibration pattern in which strength of the vibration, a vibration position, a transition of a frequency fluctuation, and the like are different depending on the event causing the vibration. For example, as shown in FIG. 2, when a suspicious action of digging a tunnel in the underground G occurs, the return light on which the vibration occurred corresponding to the tunnel digging is superimposed has a vibration pattern unique to tunnel digging.

By analyzing a dynamic change of the vibration pattern included in the return light, it is possible to identify the suspicious action in the underground G as the event causing the vibration. As the suspicious action in the underground G, in addition to the above-described action of digging a tunnel, there may be actions such as walking inside a tunnel already dug, walking while carrying an object, operating transport equipment, carrying an object by transport equipment, moving inside an existing pipe, and carrying an object in an existing pipe. Regarding the tunnel digging, there may be an action of digging by a person and an action of digging using a excavator.

Thus, the identifying unit 22 detects the vibration pattern included in the return light from the return light acquired by the acquisition unit 21 from the optical fiber 10A. The identifying unit 22 identifies the suspicious action in the underground G based on the vibration pattern included in the return light.

For example, when a tunnel is dug in the underground G across a border, the tunnel is dug from a position away from the border toward the border. Thus, it is considered that periodic vibrations occur near the border and the strength of the vibrations gradually increases. When a periodic vibration is detected at a position near the border on the optical fiber 10A as a result of analyzing the dynamic change of the vibration pattern included in the return light, and the strength of the vibration gradually increases, the identifying unit 22 can determine that a tunnel is being dug in the underground G.

As for the position on the optical fiber 10A at which the vibration is detected, which is the distance between the optical fiber 10A and the acquisition unit 21, the identifying unit 22 can identify the position on the optical fiber 10A based on, for example, a time difference between the time when the acquisition unit 21 makes pulse light incident on the optical fiber 10A and the time when the acquisition unit 21 receives the return light on which the vibration is superimposed from the optical fiber 10A.

The identifying unit 22 may identify the suspicious action in the underground G using pattern matching.

For example, as the vibration pattern included in the return light, a vibration pattern of a vibration generated when the suspicious action occurs in the underground G, which is hereinafter appropriately referred to as a vibration pattern of the suspicious action in the underground G, is stored in advance in a storage unit not shown. Note that a plurality of the vibration patterns of the suspicious actions in the underground G may be stored in the storage unit. Further, the vibration pattern of the suspicious action in the underground G may be learned by the identifying unit 22 or a learning unit not shown by machine learning or the like. The identifying unit 22 compares the vibration pattern included in the return light with the previously stored vibration pattern of the suspicious action in the underground G when identifying the suspicious action in the underground G. When the vibration pattern included in the return light matches any of the vibration patterns of the suspicious actions, the identifying unit 22 determines that a suspicious action corresponding to the matched vibration pattern has occurred in the underground G.

An example of the vibration pattern of the suspicious action in the underground G will now be described.

For example, the suspicious action in the underground G is an action in which a person or an excavator digs a tunnel in the underground G. Thus, the vibration pattern generated in association with the tunnel digging is defined as a vibration pattern of the suspicious action in the underground G. When the tunnel digging occurs, a periodic vibration occurs as described above, and strength of the vibration gradually increases. Therefore, the vibration pattern generated in association with the tunnel digging is, for example, a vibration pattern in which the periodic vibration is generated and the strength of the vibration gradually increases.

Figure 3:
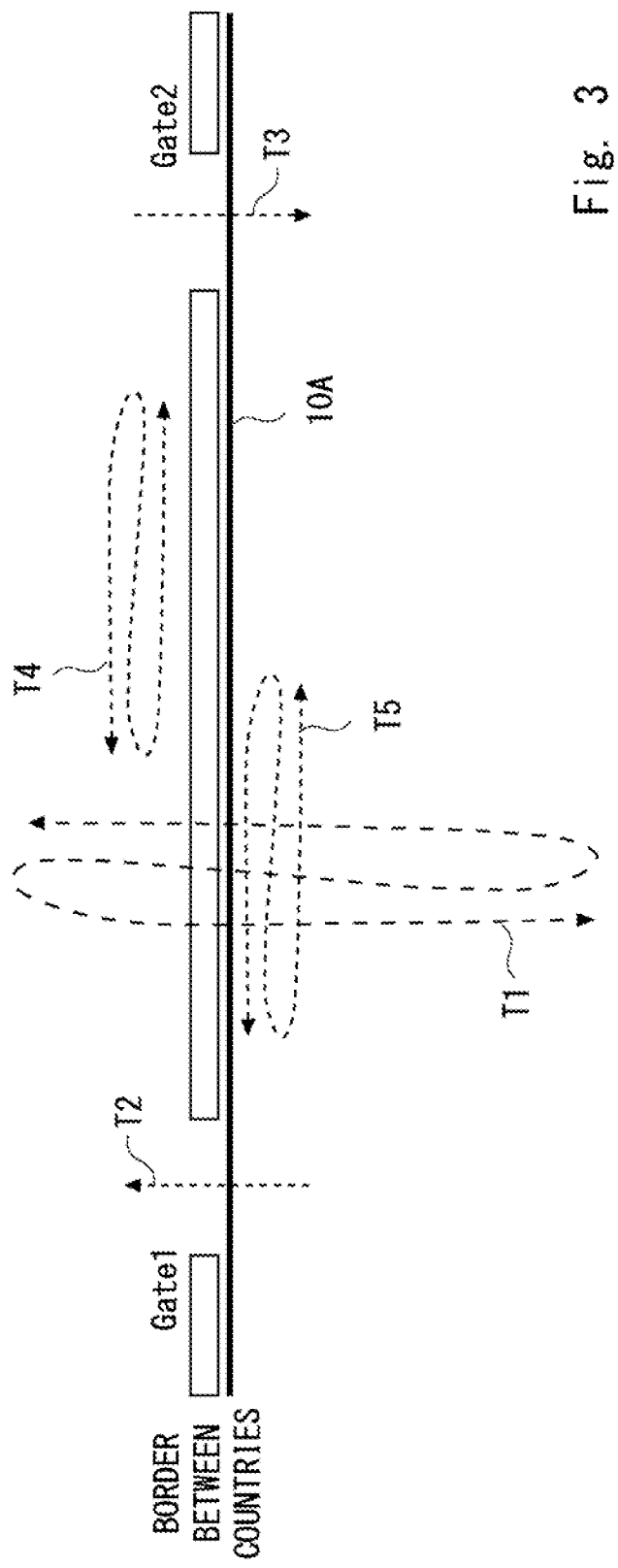
FIG. 3 shows an example of a suspicious action identified by the optical fiber sensing system according to the first example embodiment.

In addition, an action in which a person moves an existing tunnel or piping in the underground G is also a suspicious action. In particular, if an existing tunnel or piping is disposed across a boundary line such as a border, there is a possibility that a person moving in the tunnel or piping may be smuggling, which is a suspicious action that should be identified in particular. In order to identify such a suspicious action, for example, as shown in FIG. 3, the optical fiber 10A is laid along the border and the suspicious action such as moving in the underground G across the border, namely, the optical fiber 10A, is detected. FIG. 3 corresponds to a top view of the vicinity of the border viewed from the top. However, there are gates on the border for people to move between neighboring countries. As shown by trajectories T2 and T3, actions such as people or cars passing through the gates also occur, but these actions are to move along a regular route, and not suspicious actions. Therefore, as shown by a trajectory T1 in the underground G, the vibration pattern generated in association with the action of moving across the optical fiber 10A at the position where there is no gate is defined as the vibration pattern of the suspicious action in the underground G.

Note that, in the vicinity of the border, as shown by trajectories T4 and T5, some observers move along the border, which means the optical fiber 10A, to conduct surveillance, but such an action is also not a suspicious action.

Alternatively, as the vibration pattern included in the return light, a vibration pattern of a normal vibration in the underground G, which is hereinafter referred to as a normal state vibration pattern in the underground G as appropriate, may be stored in advance in the storage unit not shown. Note that a plurality of the normal state vibration patterns in the underground G may be stored in the storage unit. When the suspicious action in the underground G is identified, the identifying unit 22 compares the vibration pattern included in the return light with the previously stored normal state vibration patterns in the underground G. If the vibration pattern included in the return light is different from any of the normal state vibration patterns in the underground G, the identifying unit 22 may determine that a suspicious action has occurred. In addition, the identifying unit 22 may determine that a suspicious action has occurred when a vibration pattern that does not match the normal state vibration patterns in the underground G is detected repeatedly or a plurality of times.

Next, an operation example of the optical fiber sensing system according to the first example embodiment will be described with reference to FIG. 4.

Figure 4:
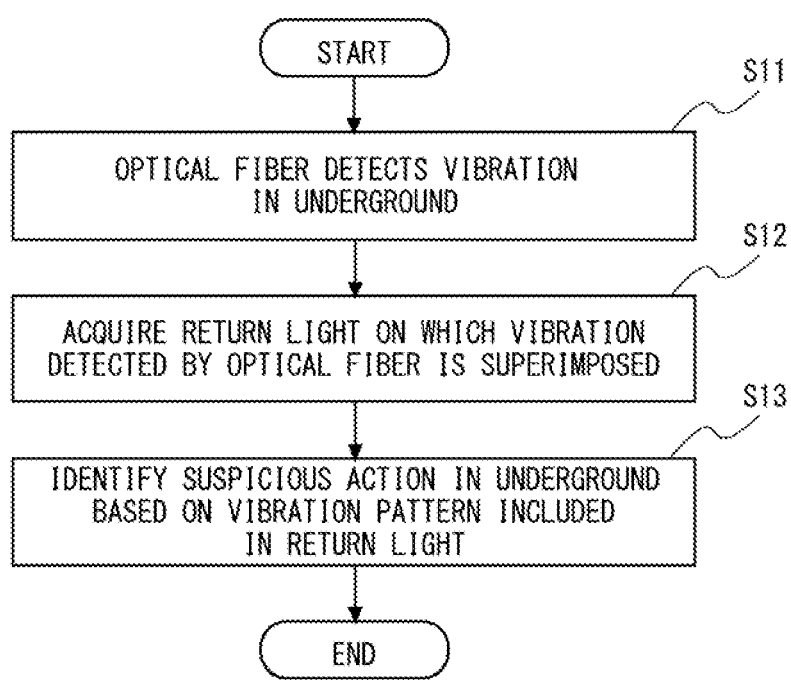
FIG. 4 is a flowchart showing an operation example of the optical fiber sensing system according to the first example embodiment.

As shown in FIG. 4, the optical fiber 10A detects the vibration in the underground G (Step S11). The vibration detected by the optical fiber 10A is superimposed on the return light transmitted through the optical fiber 10A.

Next, the acquisition unit 21 acquires, from the optical fiber 10A, the return light on which the vibration detected by the optical fiber 10A is superimposed (Step S12).

After that, the identifying unit 22 identifies the suspicious action in the underground G based on the vibration pattern included in the return light acquired by the acquisition unit 21 (Step S13).

As described above, according to the first example embodiment, the optical fiber 10A detects the vibration in the underground G. The acquisition unit 21 acquires, from the optical fiber 10A, the return light on which the vibration detected by the optical fiber 10A is superimposed. The identifying unit 22 identifies the suspicious action in the underground G based on the vibration pattern included in the return light acquired by the acquisition unit 21.

In this way, the suspicious actions such as tunnel digging in the underground G can be detected. The optical fiber 10A is inexpensive and can be easily laid in the underground G over a wide range. It is thus possible to detect the suspicious actions in the underground G inexpensively in a wide monitoring area such as a border.

Second Example Embodiment

Next, a configuration example of an optical fiber sensing system according to a second example embodiment will be described with reference to FIG. 5.

Figure 5:
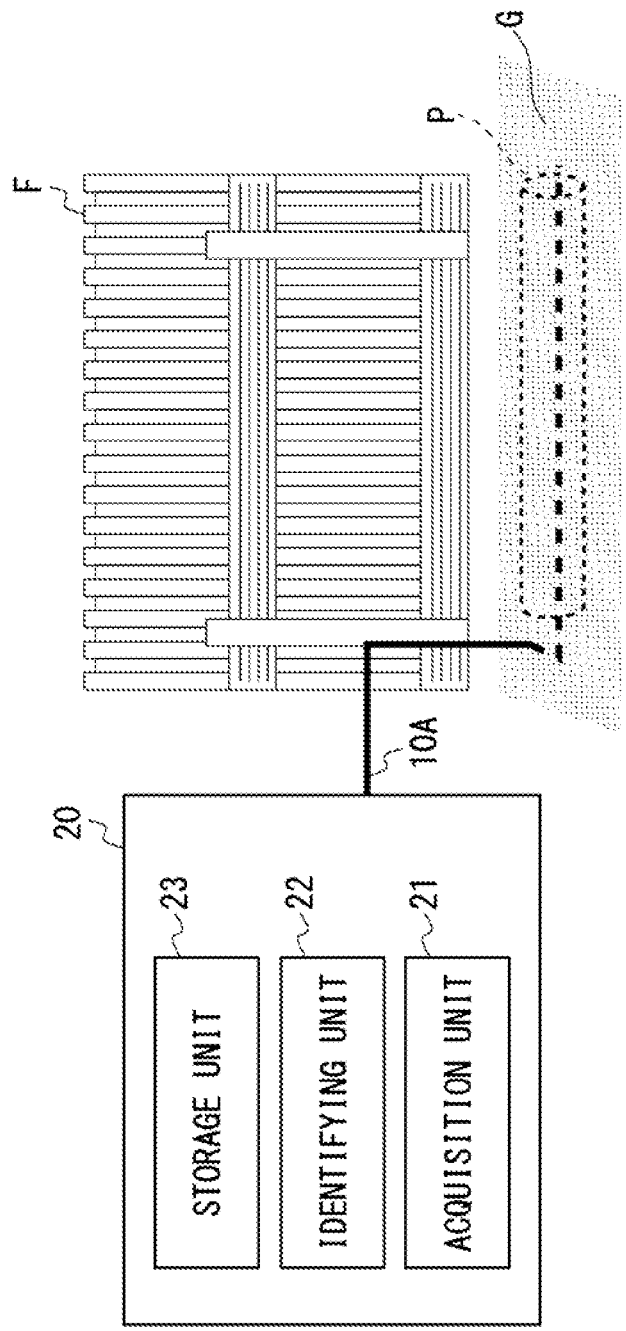
FIG. 5 shows a configuration example of the optical fiber sensing system according to the second example embodiment.

As shown in FIG. 5, the optical fiber sensing system according to the second example embodiment differs from the configuration shown in FIG. 1 according to the first example embodiment described above in that the optical fiber sensing system according to the second example embodiment further includes a storage unit 23 in the optical fiber sensing equipment 20.

The storage unit 23 previously stores, as a vibration pattern included in return light, a vibration pattern of a vibration generated when a suspicious action occurs underground G, which is a vibration pattern of a suspicious action in the underground G. Note that the storage unit 23 may store a plurality of the vibration patterns of the suspicious actions in the underground G. Further, the vibration pattern of the suspicious action in the underground G may be learned by the identifying unit 22 or a learning unit not shown by machine learning or the like.

Further, the storage unit 23 previously stores, as a vibration pattern included in the return light, a vibration pattern of a vibration generated when the underground G is in a normal state, which is hereinafter referred to as a normal state vibration pattern in the underground G as appropriate. The vibration generated when the underground G is in the normal state is, for example, a vibration of a subway traveling in the underground G, a vibration of piping such as sewers installed in the underground G, a vibration of a person walking on the ground, a vibration of a vehicle traveling on the ground, a vibration of temporary construction work, etc. Note that the storage unit 23 may store a plurality of the vibration patterns in the normal state in the underground G. Further, the vibration pattern of the normal state in the underground G may be learned by the identifying unit 22 or a learning unit not shown by machine learning or the like.

In the second example embodiment, when the vibration pattern included in the return light acquired by the acquisition unit 21 is different from the vibration pattern of the normal state in the underground G and matches the vibration pattern of the suspicious action in the underground G, the identifying unit 22 determines that a suspicious action corresponding to the matched vibration pattern has occurred in the underground G.

Alternatively, when the vibration pattern included in the return light acquired by the acquisition unit 21 is different from the vibration pattern of the normal state in the underground G, the identifying unit 22 determines that a suspicious action has occurred in the underground G.

Next, an operation example of the optical fiber sensing system according to the second example embodiment will be described with reference to FIG. 6.

Figure 6:
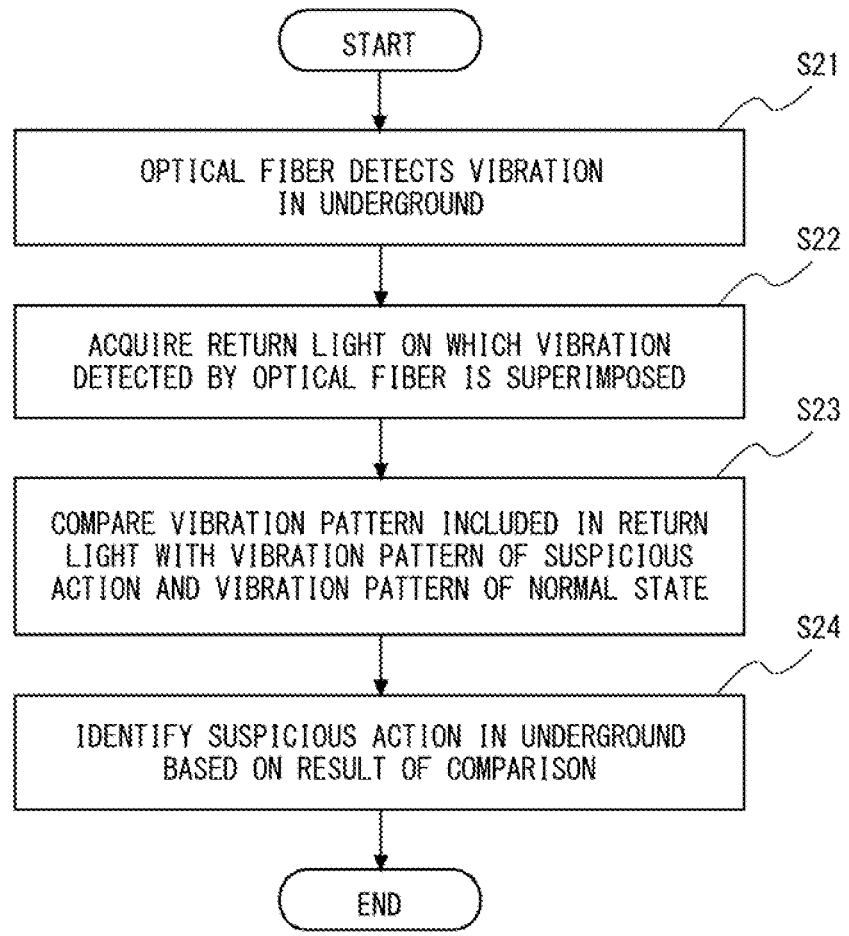
FIG. 6 is a flowchart showing an operation example of the optical fiber sensing system according to the second example embodiment.

As shown in FIG. 6, first, Steps S11 and S22 similar to Steps S21 and S12 according to the first example embodiment, respectively, shown in FIG. 4 are performed.

Next, the identifying unit 22 compares the vibration pattern included in the return light acquired by the acquisition unit 21 with the vibration pattern of the suspicious action in the underground G and the vibration pattern of the normal state in the underground G stored in advance in the storage unit 23 (Step S23).

Next, the identifying unit 22 determines whether or not a suspicious action has occurred in the underground G based on a result of the comparison in Step S23 (Step S24).

For example, when the vibration pattern included in the return light is different from any of the vibration patterns of the normal states in the underground G and matches any of the vibration patterns of the suspicious actions in the underground G, the identifying unit 22 determines that a suspicious action corresponding to the matched vibration pattern has occurred in the underground G.

Alternatively, when the vibration pattern included in the return light is different from any of the normal state vibration patterns in the underground G, the identifying unit 22 determines that a suspicious action has occurred in the underground G.

As described above, according to the second example embodiment, the storage unit 23 previously stores the vibration pattern of the suspicious action in the underground G and the vibration pattern of the normal state as the vibration patterns included in the return light. When the vibration pattern included in the return light acquired by the acquisition unit 21 is different from the vibration pattern of the normal state in the underground G and matches the vibration pattern of the suspicious action in the underground G, the identifying unit 22 determines that a suspicious action corresponding to the matched vibration pattern has occurred in the underground G. Alternatively, when the vibration pattern included in the return light is different from the vibration pattern of the normal state in the underground G, the identifying unit 22 determines that a suspicious action has occurred in the underground G.

Even when the underground G is in the normal state, for example, a vibration of a subway or the like can occur. According to the second example embodiment, the vibrations when the underground G is in the normal state are stored in advance, and when such vibrations occur, the identifying unit 22 does not determine that a suspicious action has occurred in the underground G. In this way, the accuracy of identifying the suspicious action in the underground G can be improved. Other effects are the same as those of the first example embodiment described above.

Third Example Embodiment

Next, a configuration example of an optical fiber sensing system according to a third example embodiment will be described with reference to FIG. 7.

Figure 7:
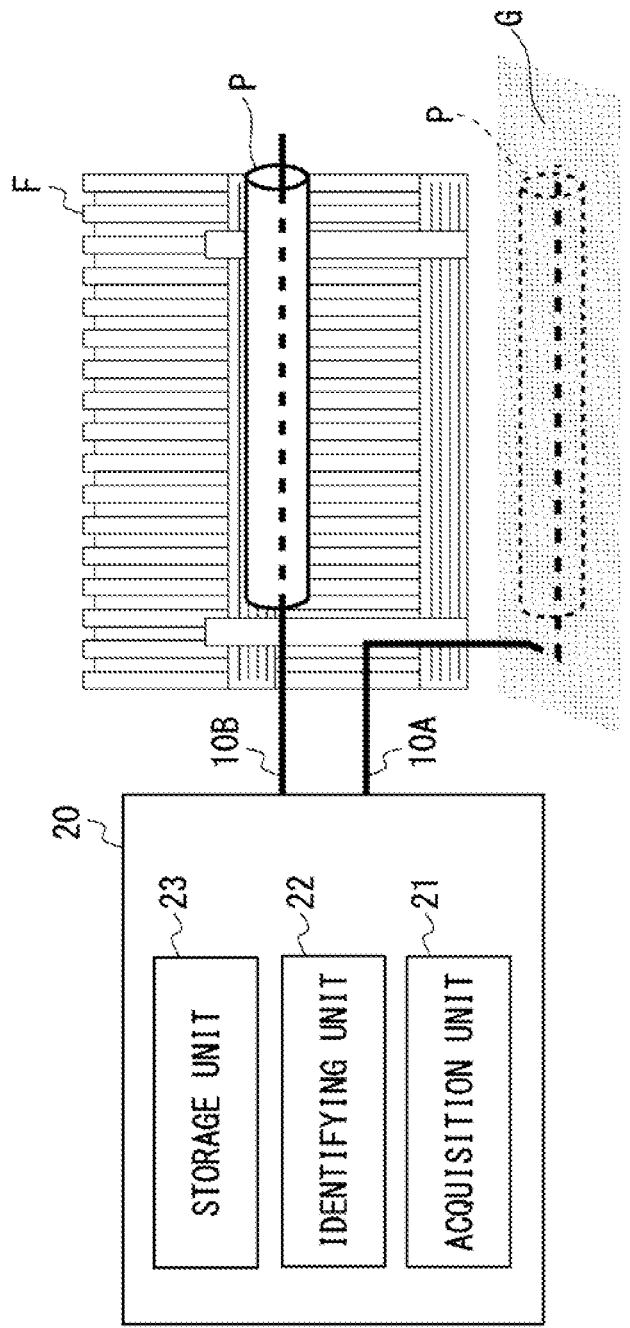
FIG. 7 shows a configuration example of an optical fiber sensing system according to a third example embodiment.

As shown in FIG. 7, the optical fiber sensing system according to the third example embodiment differs from the configuration shown in FIG. 1 according to the first example embodiment in that the optical fiber sensing system according to the third example embodiment further includes an optical fiber 10B and a storage unit 23 in the optical fiber sensing equipment 20.

The optical fiber 10B is provided on the ground of the monitoring area, and one end thereof is connected to the optical fiber sensing equipment 20. Specifically, the optical fiber 10B is laid on a fence F provided in the monitoring area.

That is, in the third example embodiment, the optical fiber 10A is provided in the underground G of the monitoring area, and the optical fiber 10B is provided on the ground of the monitoring area. However, the present disclosure is not limited to this, and the optical fibers 10A and 10B may be composed of one optical fiber, at least a part of the one optical fiber may be disposed in the underground G, and the remaining part of the optical fiber may be provided on the ground.

The optical fiber 10B is linearly laid along the fence F. However, the present disclosure is not limited to this, and the optical fiber 10B may be disposed so as to meander in a curved manner in a plane horizontal to a principal surface, namely, a surface having the largest area, of the fence F.

The optical fiber 10B is stored inside a cable P provided on the fence F. However, the present disclosure is not limited to this, and the optical fiber 10B may be attached to an outer peripheral surface of the cable P, wound around the cable P, or disposed without using the cable P.

The storage unit 23 has the same function as that of the storage unit 23 according to the second example embodiment.

However, in the third example embodiment, the storage unit 23 may store at least one vibration pattern of the suspicious action in the underground G and vibration pattern of the suspicious action in the underground G as the vibration pattern included in the return light, and it is not necessary to store both of them.

In the third example embodiment, the acquisition unit 21 not only makes pulse light incident on the optical fiber 10A and then acquires or receives the return light on which the vibration detected by the optical fiber 10A is superimposed from the optical fiber 10A, but also makes pulse light incident on the optical fiber 10B and then acquires or receives the return light on which the vibration detected by the optical fiber 10B is superimposed from the optical fiber 10B.

In the third example embodiment, when the vibration pattern included in the return light acquired from the optical fiber 10A provided in the underground G by the acquisition unit 21, which is hereinafter referred to as a vibration pattern included in the return light in the underground G as appropriate, has greater strength of the vibration than that of the vibration pattern included in the return light acquired from the optical fiber 10B provided on the ground by the acquisition unit 21, which is hereinafter referred to as a vibration pattern included in the return light on the ground as appropriate, and matches the vibration pattern of the suspicious action in the underground G, the identifying unit 22 determines that a suspicious action corresponding to the matched vibration pattern has occurred in the underground G.

Alternatively, the storage unit 23 previously stores, as a vibration pattern included in the return light, a vibration pattern of a vibration generated when the ground is in a normal state, which is hereinafter referred to as a vibration pattern of the normal state on the ground as appropriate. The vibration generated when the ground is in the normal state is, for example, a vibration generated when a person walks on the ground or a vibration generated when a vehicle travels on the ground. Therefore, as shown in FIG. 3, vibrations caused by persons or cars passing through the gates on the ground near the border indicated by trajectories T2 and T3 and vibrations caused by observers moving along the border on the ground indicated by trajectories T4 and T5 are also vibrations that are generated when the ground is in the normal state. The storage unit 23 may store a plurality of vibration patterns of the normal state on the ground. When the vibration pattern included in the return light on the ground is different from the vibration pattern of the normal state on the ground and the vibration pattern included in the return light in the underground G matches the vibration pattern of the suspicious action in the underground G, the identifying unit 22 determines that a suspicious action corresponding to the matched vibration pattern has occurred in the underground G. On the other hand, even when the vibration pattern included in the return light in the underground G matches the vibration pattern of the suspicious action in the underground G, if the vibration pattern included in the return light on the ground matches the vibration pattern of the normal state on the ground, the identifying unit 22 determines that a suspicious action has not occurred in the underground G.

Next, an operation example of the optical fiber sensing system according to the third example embodiment will be described with reference to FIG. 8.

Figure 8:
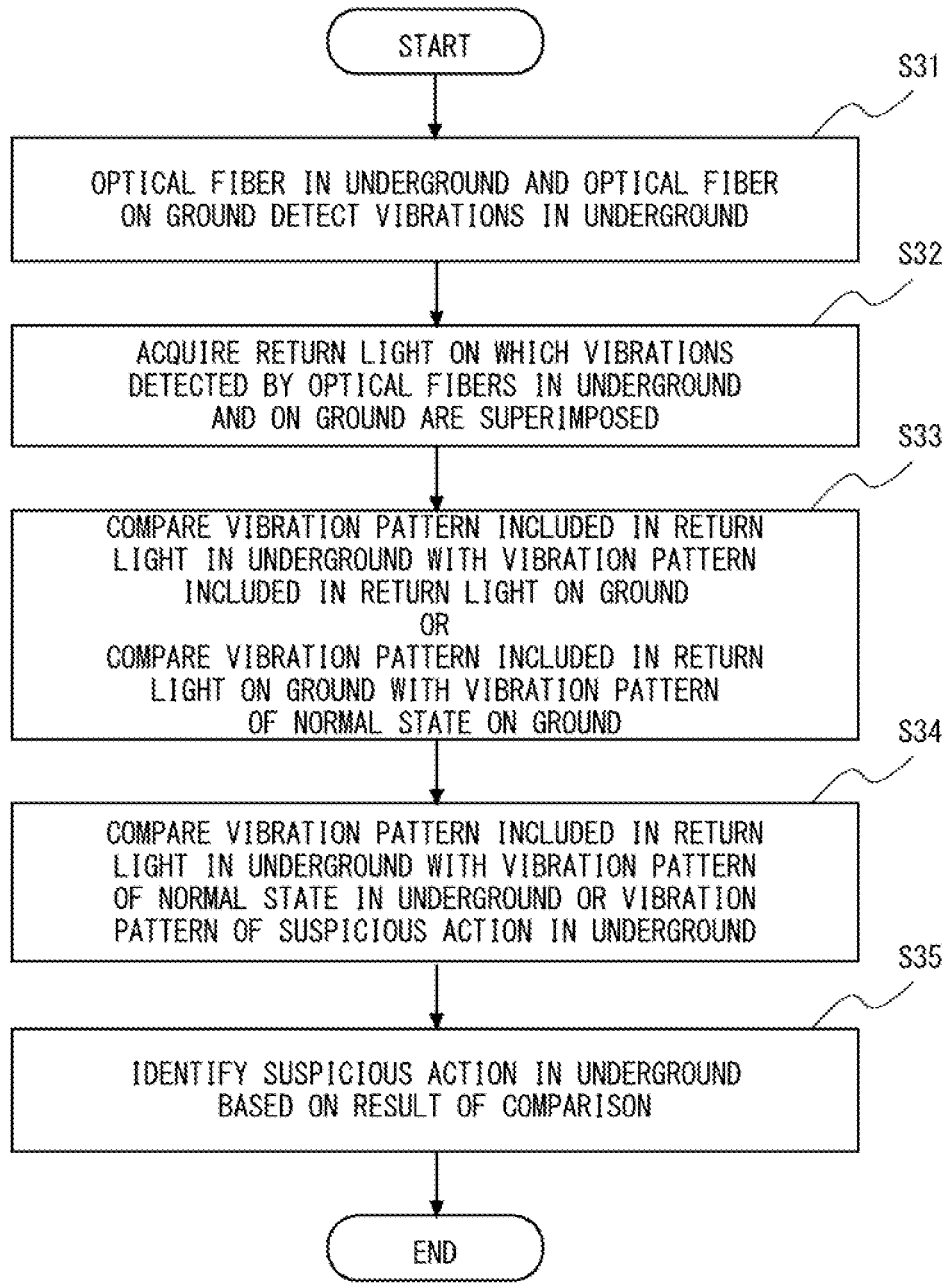
FIG. 8 is a flowchart showing an operation example of the optical fiber sensing system according to the third example embodiment.

As shown in FIG. 8, first, the optical fiber 10A provided in the underground G and the optical fiber 10B provided on the ground detect vibrations in the underground G (Step S31). The vibration detected by the optical fiber 10A is superimposed on the return light transmitted through the optical fiber 10A, and the vibration detected by the optical fiber 10B is superimposed on the return light transmitted through the optical fiber 10B.

Next, the acquisition unit 21 acquires the return light on which the vibration detected by the optical fiber 10A is superimposed from the optical fiber 10A provided in the underground G, and acquires the return light on which the vibration detected by the optical fiber 10B is superimposed from the optical fiber 10B provided on the ground (Step S32).

Next, the identifying unit 22 compares the vibration pattern included in the return light acquired by the acquisition unit 21 from the optical fiber 10A provided in the underground G, which is the vibration pattern included in the return light in the underground G, with the vibration pattern included in the return light acquired by the acquisition unit 21 from the optical fiber 10B provided on the ground, which is the vibration pattern included in the return light on the ground. Alternatively, the identifying unit 22 compares the vibration pattern included in the return light on the ground with the vibration pattern of the normal state on the ground previously stored in the storage unit 23 (Step S33).

Further, the identifying unit 22 compares the vibration pattern included in the return light in the underground G with the vibration pattern of the suspicious action in the underground G or the vibration pattern of the normal state in the underground G previously stored in the storage unit 23 (Step S34).

Next, the identifying unit 22 determines whether or not a suspicious action has occurred based on a result of the comparison in Steps S33 and S34 (Step S35).

For example, when the vibration pattern included in the return light in the underground G has strength greater than that of the return light on the ground, and the vibration pattern included in the return light in the underground G matches any of the vibration patterns of the suspicious actions in the underground G, the identifying unit 22 determines that a suspicious action corresponding to the matched vibration pattern has occurred in the underground G.

Alternatively, when the vibration pattern included in the return light in the underground G has greater strength than that of the vibration pattern included in the return light on the ground, and the vibration pattern included in the return light in the underground G is different from any of the vibration patterns in the normal state in the underground G, the identifying unit 22 determines that a suspicious action has occurred in the underground G.

Further alternatively, when the vibration pattern included in the return light on the ground is different from any of the vibration patterns of the normal states on the ground, and the vibration pattern included in the return light in the underground G matches the vibration pattern of the suspicious action in the underground G, the identifying unit 22 determines that a suspicious action corresponding to the matched vibration pattern has occurred in the underground G.

Further alternatively, when the vibration pattern included in the return light on the ground is different from any of the vibration patterns of the normal states on the ground, and the vibration pattern included in the return light in the underground G is different from any of the vibration patterns of the normal states in the underground G, the identifying unit 22 determines that a suspicious action has occurred in the underground G.

As described above, according to the third example embodiment, the optical fiber 10A is provided in the underground G, and the optical fiber 10B is provided on the ground. The storage unit 23 stores the vibration pattern of the suspicious action in the underground G or the vibration pattern of the normal state in the underground G as the vibration patterns included in the return light, and previously stores the vibration pattern of the normal state on the ground. When the vibration pattern included in the return light in the underground G has strength greater than that of the return light on the ground, and the vibration pattern included in the return light in the underground G matches any of the vibration patterns of the suspicious actions in the underground G, the identifying unit 22 determines that a suspicious action corresponding to the matched vibration pattern has occurred in the underground G. Alternatively, when the vibration pattern included in the return light in the underground G has strength greater than that of the vibration pattern included in the return light on the ground, and the vibration pattern included in the return light in the underground G is different from the vibration pattern of the normal state in the underground G, the identifying unit 22 determines that a suspicious action has occurred in the underground G. Further alternatively, when the vibration pattern included in the return light on the ground is different from the vibration pattern of the normal state on the ground and the vibration pattern included in the return light in the underground G matches the vibration pattern of the suspicious action in the underground G, the identifying unit 22 determines that a suspicious action corresponding to the matched vibration pattern has occurred in the underground G. Further alternatively, when the vibration pattern included in the return light on the ground is different from the vibration pattern of the normal state on the ground, and the vibration pattern included in the return light in the underground G is different from the vibration pattern of the normal state in the underground G, the identifying unit 22 determines that a suspicious action has occurred in the underground G.

For example, a suspicious action of digging a tunnel can occur not only in the underground G but also on the ground. According to the third example embodiment, when the suspicious action of tunnel digging occurs on the ground, the vibration pattern included in the return light in the underground G has strength greater than that of the vibration pattern included in the return light on the ground. In this case, the identifying unit 22 does not determine that a suspicious action has occurred in the underground G. Alternatively, when the vibration pattern included in the return light on the ground matches the vibration pattern of the normal state on the ground, the identifying unit 22 does not determine that a suspicious action has occurred in the underground G. In this way, the accuracy of identifying a suspicious action in the underground G can be improved. Other effects are the same as those of the first example embodiment described above.

Fourth Example Embodiment

Next, a configuration example of an optical fiber sensing system according to a fourth example embodiment will be described with reference to FIG. 9.

Figure 9:
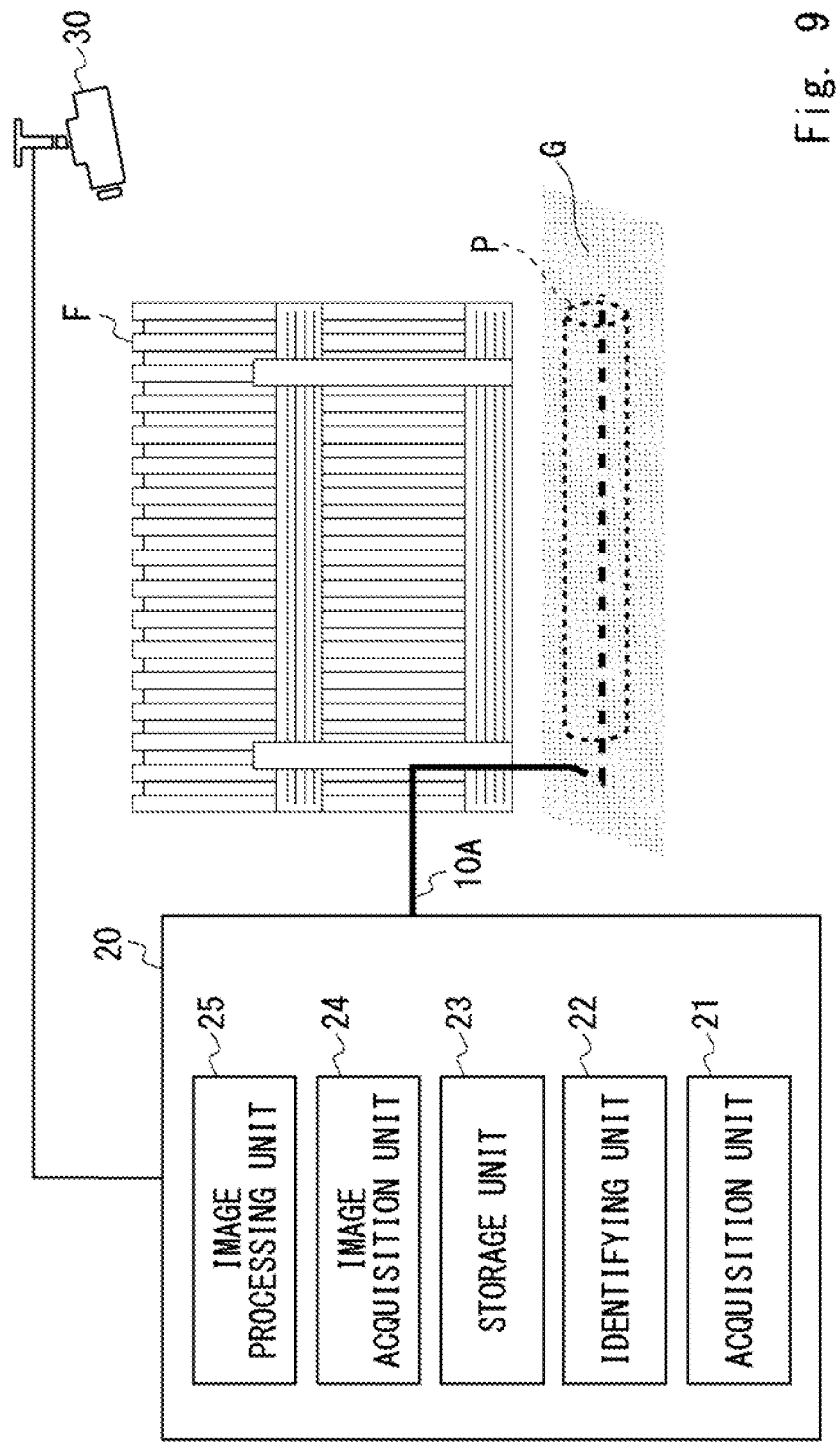
FIG. 9 shows a configuration example of an optical fiber sensing system according to a fourth example embodiment.

As shown in FIG. 9, the optical fiber sensing system according to the fourth example embodiment differs from the configuration shown in FIG. 1 according to the first example embodiment in that the optical fiber sensing system according to the fourth example embodiment further includes a camera 30, and a storage unit 23, an image acquisition unit 24, and an image processing unit 25 in the optical fiber sensing equipment 20. Although only one camera 30 is provided in FIG. 9, a plurality of the cameras 30 may be provided.

The camera 30 is capable of capturing at least a part of a ground part of the monitoring area, and is implemented by, for example, a fixed camera, a Pan Tilt Zoom (PTZ) camera or the like. As will be described later, the camera 30 is used to confirm from a camera image whether or not a suspicious action corresponding to a suspicious action in the underground G is occurring on the ground. Therefore, image quality of the camera 30 should only be sufficient to confirm whether or not a suspicious action is occurring on the ground. The camera 30 may be a dedicated camera for monitoring the vicinity of the fence F, or a camera installed in the town may be used as the camera 30.

The image acquisition unit 24 acquires a camera image captured by the camera 30. More specifically, when the acquisition unit 21 acquires the return light on which the vibration having the same vibration pattern as that of the suspicious action in the underground G is superimposed, the image acquisition unit 24 controls the camera 30 to capture the position on the optical fiber 10A where the vibration is detected, and acquires the camera image captured by the camera 30 at that time. For example, the image acquisition unit 24 controls the angle, which is an azimuth angle and an elevation angle, the zoom magnification, and the like of the camera 30 so that the camera 30 faces the corresponding position of the optical fiber 10A or the direction of the corresponding position, or so that the camera 30 captures a wide-angle image of an area including the corresponding position of the optical fiber 10A.

In order to acquire the camera image as described above, it is necessary to perform processing of identifying the position of the optical fiber 10A where the vibration having the vibration pattern that matches the vibration pattern of the suspicious action in the underground G is detected, and processing of converting the identified position on the optical fiber 10A into the position on the camera image. As described above, the position on the optical fiber 10A may be identified by the identifying unit 22 based on a time difference between a time when the pulse light is incident on the optical fiber 10A and a time when the return light on which the vibration is superimposed is received from the optical fiber 10A. For the position conversion, for example, the image acquisition unit 24 may previously hold a correspondence table in which the distance between the optical fiber 10A and the acquisition unit 21 is associated with camera coordinates, and perform the position conversion described above using this correspondence table. Further, the image acquisition unit 24 may acquire the camera images from the plurality of cameras 30 if the corresponding position on the optical fiber 10A can be captured by the plurality of cameras 30.

The image processing unit 25 recognizes the camera image acquired by the image acquisition unit 24, and detects a suspicious action on the ground from a result of the image recognition. The suspicious action on the ground corresponds to the suspicious action in the underground G identified by the identifying unit 22. For example, when the identifying unit 22 identifies a suspicious action of digging a tunnel in the underground G, the image processing unit 25 detects a suspicious action of digging the tunnel on the ground.

The storage unit 23 has the same function as that of the storage unit 23 according to the second example embodiment.

However, in the fourth example embodiment, the storage unit 23 may store at least one of the vibration pattern of the suspicious action in the underground G and the vibration pattern of the normal state in the underground G as the vibration pattern included in the return light, and it is not necessary to store both of them.

In the fourth example embodiment, when the vibration pattern included in the return light acquired by the acquisition unit 21 matches the vibration pattern of the suspicious action in the underground G, and the image processing unit 25 cannot detect a suspicious action on the ground from the camera image, the identifying unit 22 determines that a suspicious action corresponding to the matched vibration pattern has occurred in the underground G.

Next, an operation example of the optical fiber sensing system according to the fourth example embodiment will be described with reference to FIG. 10.

Figure 10:
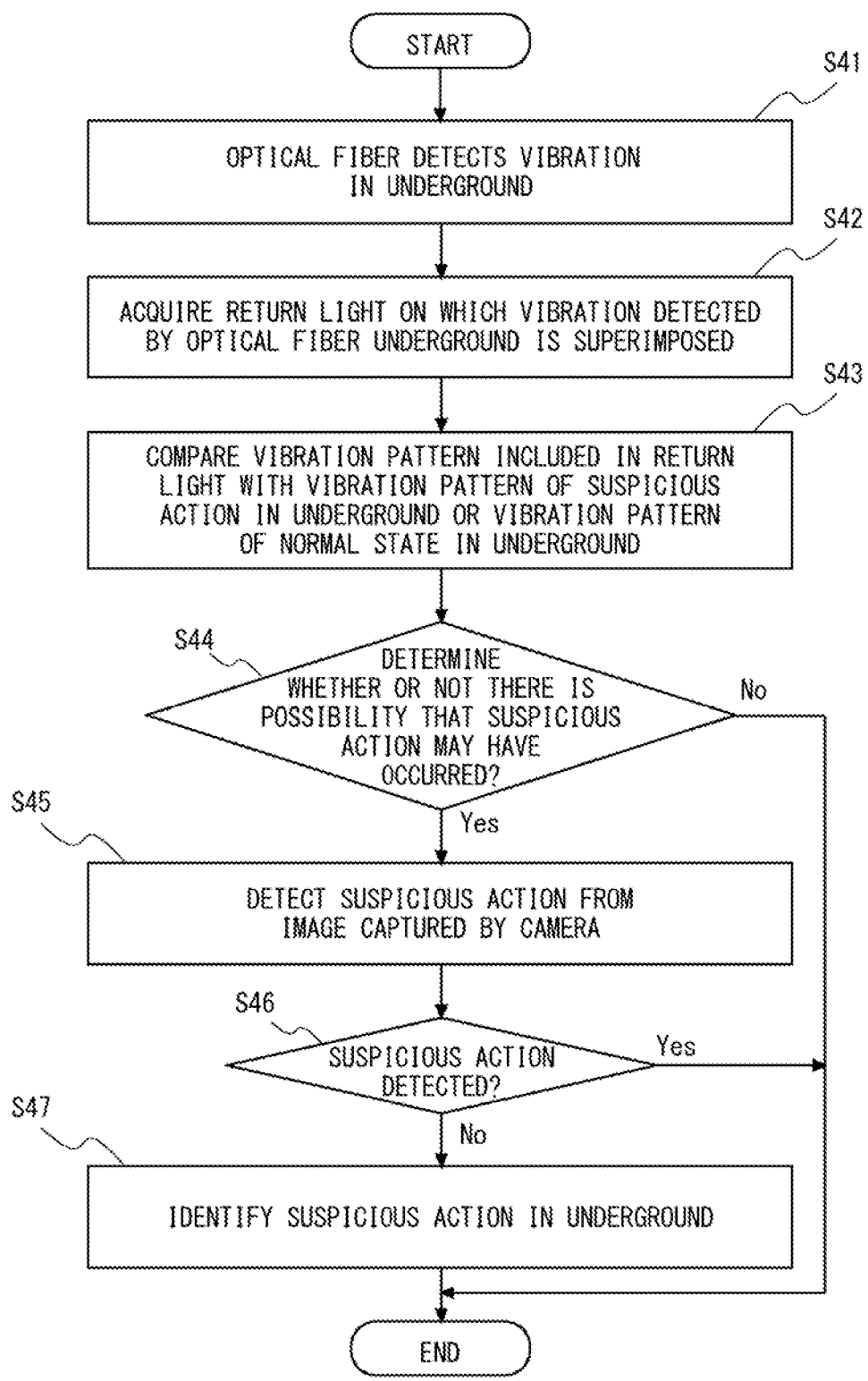
FIG. 10 is a flowchart showing an operation example of the optical fiber sensing system according to the fourth example embodiment.

As shown in FIG. 10, first, Steps S41 and S42 similar to Steps S11 and S12 according to the first example embodiment, respectively, shown in FIG. 4 are performed.

Next, the identifying unit 22 compares the vibration pattern included in the return light acquired by the acquisition unit 21 with the vibration pattern of the suspicious action in the underground G or the vibration pattern of the normal state in the underground G previously stored in the storage unit 23 (Step S43).

Next, the identifying unit 22 determines whether or not there is a possibility that a suspicious action may have occurred based on a result of the comparison in Step S43 (Step S44). For example, when the vibration pattern included in the return light matches any of the vibration patterns of the suspicious actions in the underground G or is different from any of the vibration patterns of the normal states in the underground G, the identifying unit 22 determines that a suspicious action may have occurred.

If there is a possibility that a suspicious action has occurred (Yes in Step S44), the image acquisition unit 24 controls the camera 30 to capture the position on the optical fiber 10A where the vibration having the vibration pattern that matches the suspicious action is detected and acquire the captured camera image. Next, the image processing unit 25 detects a suspicious action on the ground from the camera image acquired by the image acquisition unit 24 (Step S45).

When the image processing unit 25 can detect a suspicious action on the ground (Yes in Step S46), the identifying unit 22 determines that a suspicious action has occurred on the ground, and ends the processing.

On the other hand, if the image processing unit 25 cannot detect a suspicious action on the ground (No in Step S46), the identifying unit 22 determines that a suspicious action corresponding to the vibration pattern matched in Step S44 has occurred in the underground G (Step S47).

As described above, according to the fourth example embodiment, the camera 30 capable of capturing the ground is provided. The storage unit 23 previously stores the vibration pattern of the suspicious action in the underground G or the vibration pattern of the normal state in the underground G as the vibration patterns of the return light. When the vibration pattern included in the return light matches the vibration pattern of the suspicious action in the underground G or is different from the vibration pattern of the normal state in the underground G, and the image processing unit 25 cannot detect a suspicious action on the ground, the identifying unit 22 determines that a suspicious action has occurred in the underground G.

For example, a suspicious action of digging a tunnel can occur not only in the underground G but also on the ground. According to the fourth example embodiment, when a suspicious action of tunnel digging occurs on the ground, the suspicious action is detected by the image processing unit 25. In this case, the identifying unit 22 does not determine that a suspicious action has occurred in the underground G. In this way, the accuracy of identifying a suspicious action in the underground G can be improved. Other effects are the same as those of the first example embodiment described above.

Fifth Example Embodiment

Next, a configuration example of an optical fiber sensing system according to a fifth example embodiment will be described with reference to FIG. 11.

Figure 11:
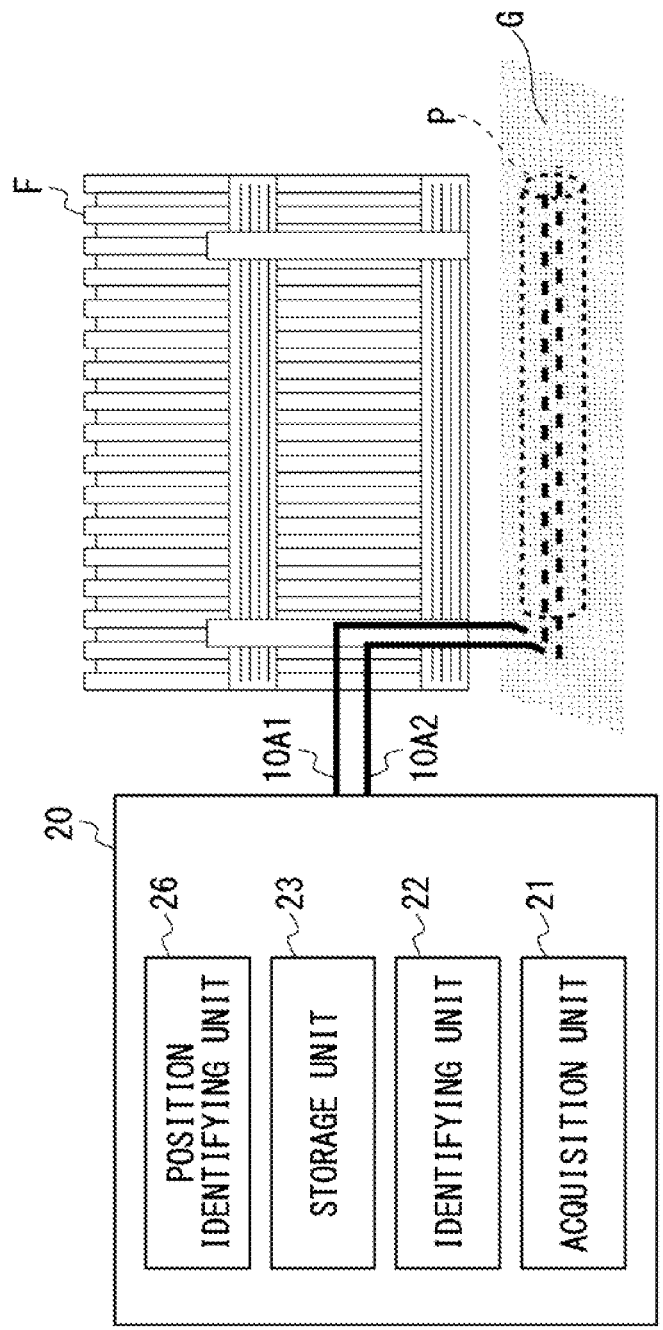
FIG. 11 shows a configuration example of an optical fiber sensing system according to a fifth example embodiment.

As shown in FIG. 11, the optical fiber sensing system according to the fourth example embodiment differs from the configuration shown in FIG. 1 according to the first example embodiment described above in that the optical fiber sensing system according to the fourth example embodiment further includes two optical fibers 10A1 and 10A2 instead of the optical fiber 10A, and includes a storage unit 23 and a position identifying unit 26 in the optical fiber sensing equipment 20.

The optical fibers 10A1 and 10A2 are provided in the underground G of the monitoring area, and one end thereof is connected to the optical fiber sensing equipment 20.

The optical fibers 10A1 and 10A2 are disposed in parallel to each other and linearly disposed in the underground G along the fence F in a plane substantially horizontal to a ground surface. The optical fiber 10A1 is disposed near the fence F, and the optical fiber 10A2 is disposed at a position separated from the optical fiber 10A1 by a predetermined distance in a direction away from the fence F.

The storage unit 23 has the same function as that of the storage unit 23 according to the second example embodiment.

However, in the fifth example embodiment, the storage unit 23 may store the vibration pattern of the suspicious action in the underground G as the vibration pattern included in the return light, and it is not necessary to store the vibration pattern of the normal state in the underground G.

In the fifth example embodiment, the acquisition unit 21 makes pulse light incident on the optical fiber 10A1 and then acquires or receives return light on which a vibration detected by the optical fiber 10A1 is superimposed from the optical fiber 10A1 and makes pulse light incident on the optical fiber 10A2 and then acquires or receives return light on which a vibration detected by the optical fiber 10A2 is superimposed from the optical fiber 10A2.

In the fifth example embodiment, when the vibration pattern included in the return light acquired from the optical fiber 10A1 by the acquisition unit 21 or the vibration pattern included in the return light acquired from the optical fiber 10A2 by the acquisition unit 21 matches the vibration pattern of the suspicious action in the underground G, the identifying unit 22 determines that a suspicious action corresponding to the matched vibration pattern has occurred in the underground G.

When the identifying unit 22 determines that a suspicious action has occurred in the underground G, the position identifying unit 26 identifies a position where the suspicious action has occurred, which is hereinafter referred to as an occurrence position, based on the vibration pattern included in the return light acquired by the acquisition unit 21.

Figure 12:
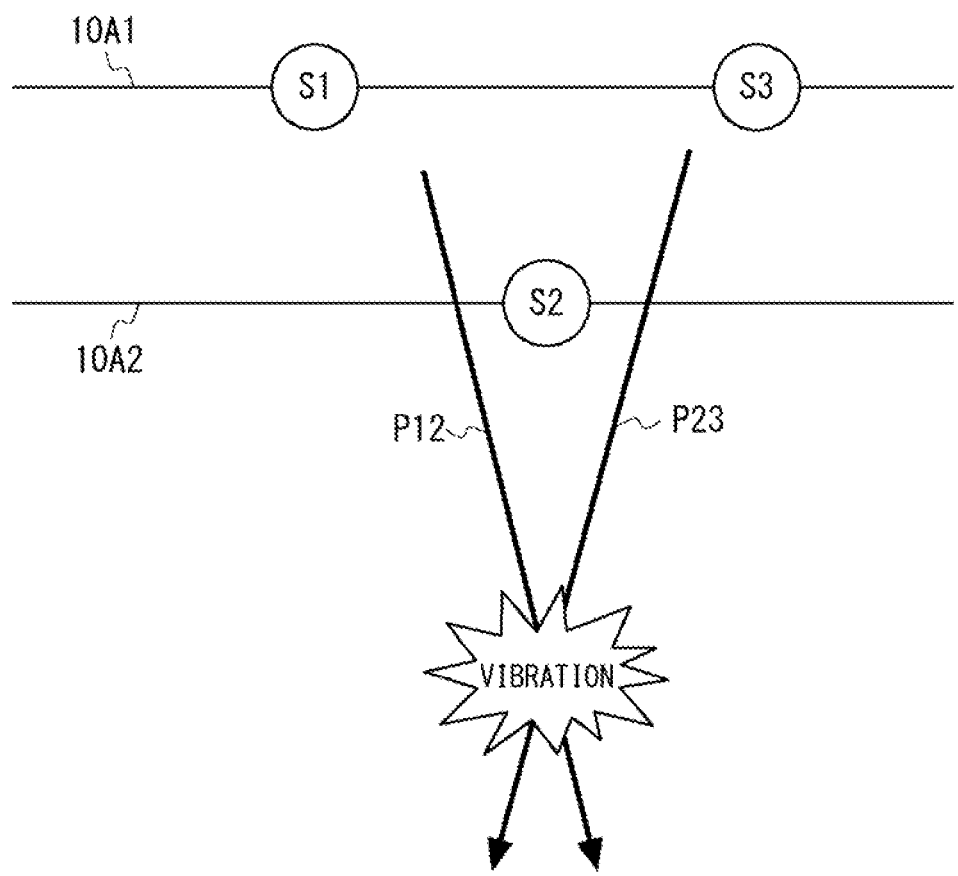
FIG. 12 shows an example of a method in which a position identifying unit according to the fifth example embodiment identifies a position where a suspicious action occurs.
Figure 13:
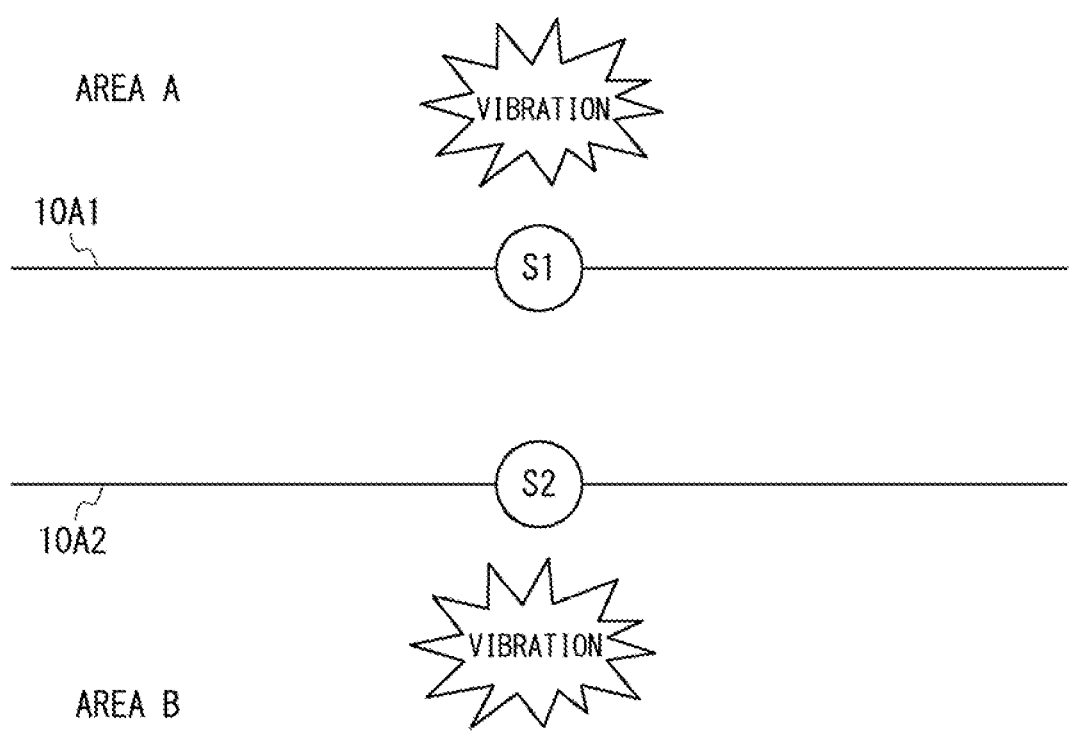
FIG. 13 shows an example of a method in which the position identifying unit according to the fifth example embodiment identifies the position where the suspicious action occurs.

Referring now to FIGS. 12 and 13, an example of a method of identifying the occurrence position of the suspicious action performed by the position identifying unit 26 will be described.

In the example of FIG. 12, first, the position identifying unit 26 selects one sensing point on the optical fiber 10A1 and one sensing point on the optical fiber 10A2 from among the positions on the optical fibers 10A1 and 10A2 at which vibrations having the vibration patterns matching the suspicious action in the underground G are detected. Here, a sensing point S1 on the optical fiber 10A1 and a sensing point S2 on the optical fiber 10A2 are selected. Next, the position identifying unit 26 analyzes a distribution of the vibrations detected at the two sensing points S1 and S2, which is the distribution of the strength of the detected vibrations and the time when the vibrations are detected, derives a difference between the strength of the vibration detected at the sensing point S1 and that of the vibration detected at the sensing point S2 and a time difference between the vibration detected at the sensing point S1 and that of the vibration detected at the sensing point S2 from the analyzed distribution of the vibrations, and then estimates the occurrence position of the suspicious action based on the derived strength difference and the time difference. Here, the occurrence position of the suspicious action is estimated to be any position on a line P12. Next, the position identifying unit 26 selects one sensing point on the optical fiber 10A1 and one sensing point on the optical fiber 10A2 so that the combination of the two sensing points becomes different from the combination of the two points selected above. Here, a sensing point S3 on the optical fiber 10A1 and the sensing point S2 on the optical fiber 10A2 are selected. Next, as described above, the position identifying unit 26 estimates the occurrence position of the suspicious action from the distribution, which is the distribution of the strength and time, of the vibrations detected at the two sensing points S2 and S3. Here, the occurrence position of the suspicious action is estimated to be any position on a line P23. Then, the position identifying unit 26 identifies the position where the line P12 and the line P23 cross each other as the occurrence position of the suspicious action.

In the example of FIG. 13, first, the position identifying unit 26 selects one sensing point on the optical fiber 10A1 and one sensing point on the optical fiber 10A2 from among the positions on the optical fibers 10A1 and 10A2 at which vibrations having vibration patterns matching the suspicious action in the underground G are detected. Here, the sensing point S1 on the optical fiber 10A1 and the sensing point S2 on the optical fiber 10A2 are selected. Then, the position identifying unit 26 analyzes a distribution of the vibrations detected at the two sensing points S1 and S2, which is the strength of the detected vibrations and the time when the vibrations are detected, derives a difference between the strength of the vibration detected at the sensing point S1 and that of the vibration detected at the sensing point S2 and a time difference between the vibration detected at the sensing point S1 and that of the vibration detected at the sensing point S2 from the analyzed distribution of the vibrations. For example, when a suspicious action occurs in an area A, the vibration corresponding to the suspicious action is detected at the sensing point S1 earlier than that at the sensing point S2, and the strength of the vibration corresponding to the suspicious action detected at the sensing point S1 is also greater than that at the sensing point S2. Therefore, when such vibrations are detected at the sensing points S1 and S2, the position identifying unit 26 identifies the area A as the occurrence position of the suspicious action. Furthermore, when a suspicious action occurs in an area B, the vibration corresponding to the suspicious action is detected at the sensing point S2 earlier than that at the sensing point S1, and the strength of the vibration corresponding to the suspicious action detected at the sensing point S1 is also greater than that at the sensing point S2. Therefore, when such vibrations are detected at the sensing points S1 and S2, the position identifying unit 26 identifies the area B as the occurrence position of the suspicious action.

Note that the method of identifying the occurrence position of the suspicious action shown in FIGS. 12 and 13 is only one example and is not limited to this.

Further, when the sensing points are selected as shown in FIGS. 12 and 13, the occurrence position of the suspicious action can be identified. Thus, it is not always necessary to provide two optical fibers 10A1 and 10A2, and one optical fiber may be disposed to pass through the sensing points as shown in FIGS. 12 and 13. In this case, one optical fiber may be disposed in the underground G so as to meander in a curved manner in a plane substantially horizontal to the ground.

In the case of tunnel digging, the occurrence position of the suspicious action may change as the digging proceeds. For this reason, it may be determined that there is an abnormality when a vibration pattern corresponding to a digging sound or simply a vibration pattern which is not normal approaches continuously and periodically. In this case, a direction and an area of an exit of a tunnel may be identified from a change in a position of a source of the approaching sound. Further, the vibration pattern may be detected at a fixed interval such as every day, and an occurrence position and a direction may be identified from changes in strength and time of the approaching sound.

Next, an operation example of the optical fiber sensing system according to the fifth example embodiment will be described with reference to FIG. 14.

Figure 14:
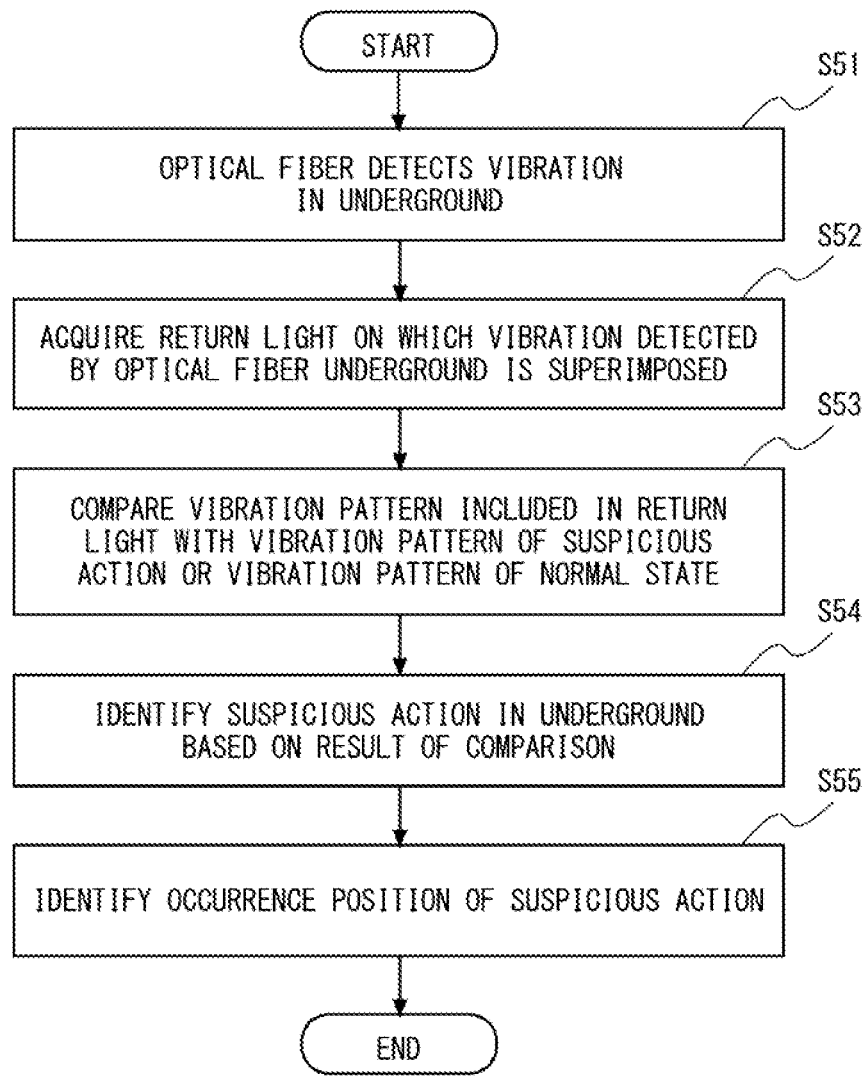
FIG. 14 is a flowchart showing an operation example of the optical fiber sensing system according to the fifth example embodiment.

As shown in FIG. 14, first, the optical fibers 10A1 and 10A2 detect vibrations in the underground G (Step S51). The vibration detected by the optical fiber 10A1 is superimposed on the return light transmitted through the optical fiber 10A1, and the vibration detected by the optical fiber 10A2 is superimposed on the return light transmitted through the optical fiber 10A2.

Next, the acquisition unit 21 acquires the return light on which the vibration detected by the optical fiber 10A1 is superimposed from the optical fiber 10A1, and acquires the return light on which the vibration detected by the optical fiber 10A2 is superimposed from the optical fiber 10A2 (Step S52).

Next, the identifying unit 22 compares the vibration patterns included in the return light acquired by the acquisition unit 21 from the optical fibers 10A1 and 10A2 with the vibration pattern of the suspicious action in the underground G or the vibration pattern of the normal state in the underground G previously stored in the storage unit 23 (Step S53).

Next, the identifying unit 22 determines whether or not a suspicious action has occurred based on a result of the comparison in Step S53 (Step S54).

For example, if any of the vibration patterns of the return light acquired by the acquisition unit 21 from the optical fibers 10A1 and 10A2 matches any of the vibration patterns of the suspicious actions in the underground G, the identifying unit 22 identifies that a suspicious action corresponding to the matched vibration pattern has occurred in the underground G.

Alternatively, when any of the vibration patterns of the return light acquired by the acquisition unit 21 from the optical fibers 10A1 and 10A2 is different from any of the vibration patterns of the normal states in the underground G, the identifying unit 22 identifies that a suspicious action has occurred in the underground G.

After that, the position identifying unit 26 identifies the occurrence position where the suspicious action has occurred in the underground G based on the vibration pattern included in the return light acquired by the acquisition unit 21 (Step S55).

As described above, according to the fifth example embodiment, when the identifying unit 22 determines that a suspicious action has occurred in the underground G, the position identifying unit 26 identifies the occurrence position where the suspicious action has occurred in the underground G based on the vibration pattern included in the return light. Thus, not only the suspicious action such as tunnel digging in the underground G can be detected, but also the occurrence position of the suspicious action can be identified even when the occurrence position of the suspicious action is located away from the optical fiber 10. The direction of the occurrence position of the suspicious action can also be identified. Other effects are the same as those of the first example embodiment described above.

Other Example Embodiment

Figure 15:
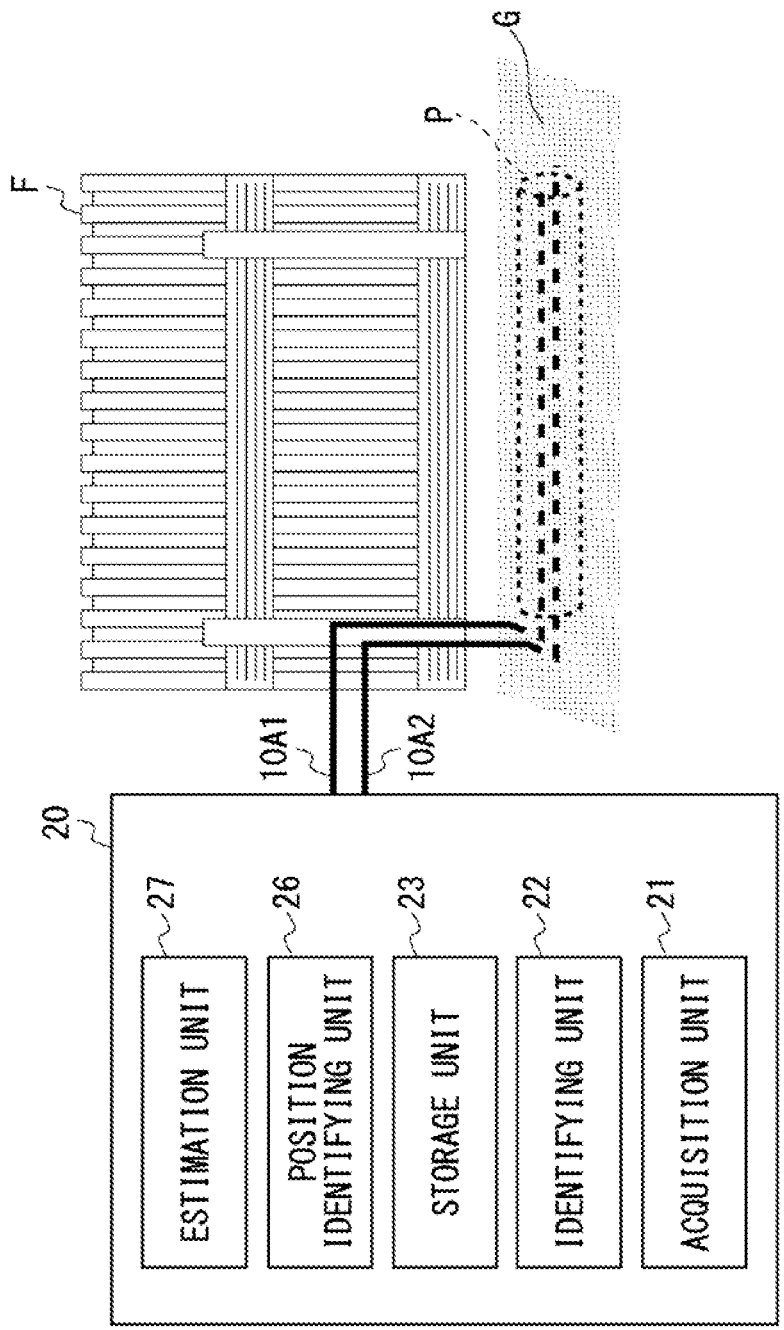
FIG. 15 shows a configuration example of an optical fiber sensing system according to other example embodiments.

As shown in FIG. 15, the optical fiber sensing equipment 20 may include an estimation unit 27 for estimating an exit position of the tunnel when it is determined that tunnel digging has occurred as a suspicious action in the underground G.

For example, the estimation unit 27 may estimate a concentric circle shape separated by a predetermined distance from the occurrence position of the tunnel digging identified by the position identifying unit 26 in the above-described fifth example embodiment as the exit position of the tunnel.

In addition, it is highly likely that an abandoned house or a place with piping such as water pipes is present may be selected as the exit of the tunnel. For this reason, the estimation unit 27 may refer to map information and estimate the position of the abandoned house or the piping as the exit position of the tunnel, if there is an abandoned house or a place with piping in the vicinity of the occurrence position of the tunnel digging identified by the position identifying unit 26.

The estimation unit 27 may also acquire return light from an optical fiber other than the optical fiber used in each of the above-described example embodiments, for example, optical fibers located away from the monitoring area, and then estimate the exit position of the tunnel by further using the acquired return light.

The position identifying unit 26 may repeatedly identify the occurrence position of the tunnel digging in the above-described fifth example embodiment, and the estimation unit 27 may estimate the exit position of the tunnel based on the time-series change of the occurrence position of the tunnel digging.

When it is determined that a movement in the existing piping or carrying of an object in the existing piping has occurred as a suspicious action in the underground G, the position identifying unit 26 may identify a position where the existing piping is laid or an exit of the existing piping. In this case, the position identifying unit 26 may identify the position where the existing piping is laid or an exit of the existing piping in combination with the map.

Further, the identifying unit 22 may set a suspicious level when a suspicious action in the underground G is identified. For example, when tunnel digging is identified as the suspicious action, if the strength of vibrations is large, the digging may be carried out by a large number of people. In addition, if the duration of the vibrations is long, a digging work may be carried out using a machine tool such as a drill. Therefore, the optical fiber sensing equipment 20 may set the suspicious level high when the strength of the vibrations is large or the duration of the vibrations is long.

Figure 16:
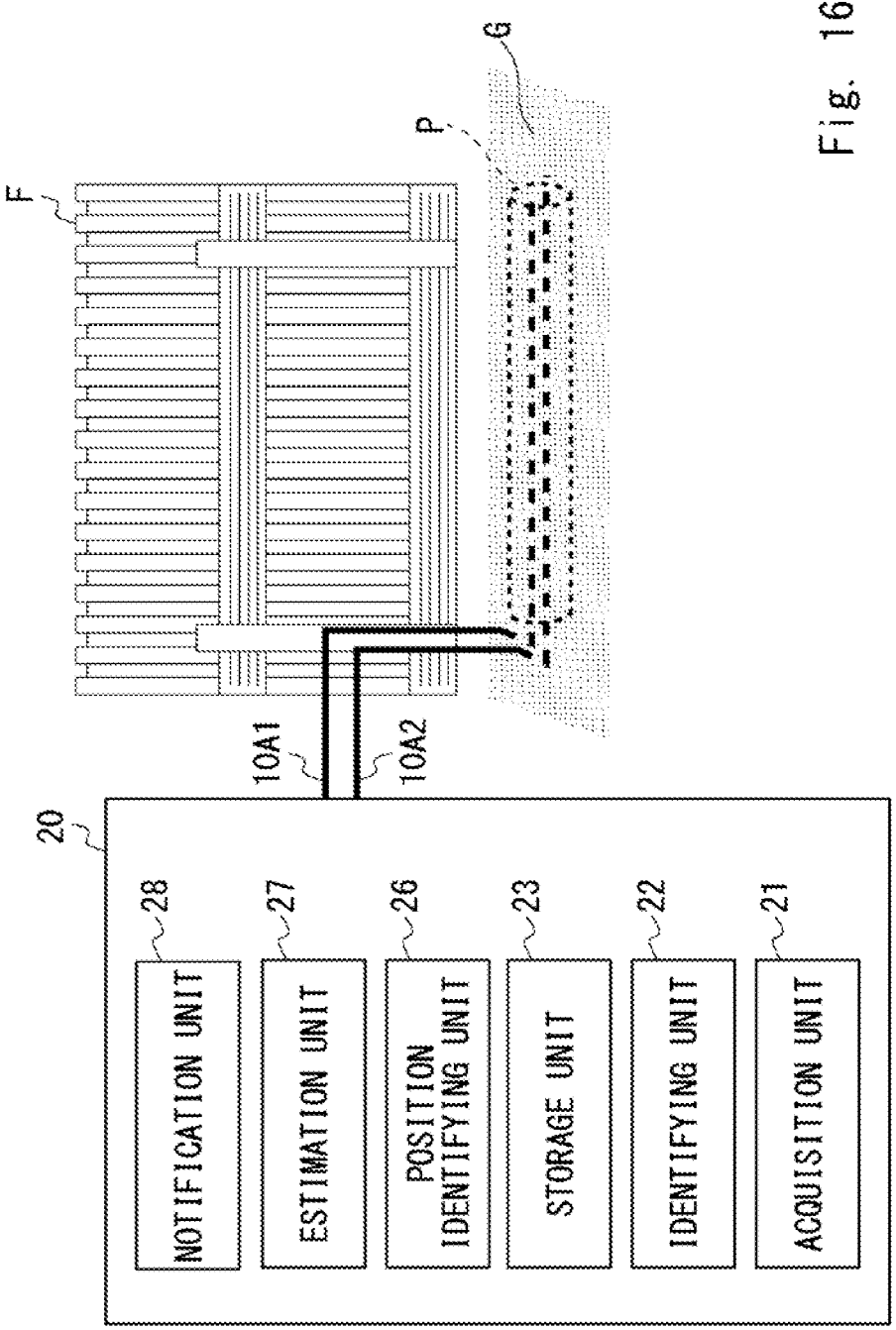
FIG. 16 shows a configuration example of an optical fiber sensing system according to other example embodiments.

As shown in FIG. 16, the optical fiber sensing equipment 20 may include a notification unit 28 for notifying that a person or a drone is to be dispatched to the occurrence position of the tunnel digging identified by the position identifying unit 26 or the exit position of the tunnel estimated by the estimation unit 27 when the suspicious level is equal to or higher than a threshold. The notification destination may be, for example, a monitoring system or a monitoring room for monitoring a monitoring target area. The notification method may be, for example, a method of displaying a Graphical User Interface (GUI) screen on a display or monitor of the notification destination, or a method of outputting a message by voice from a speaker of the notification destination.

Figure 17:
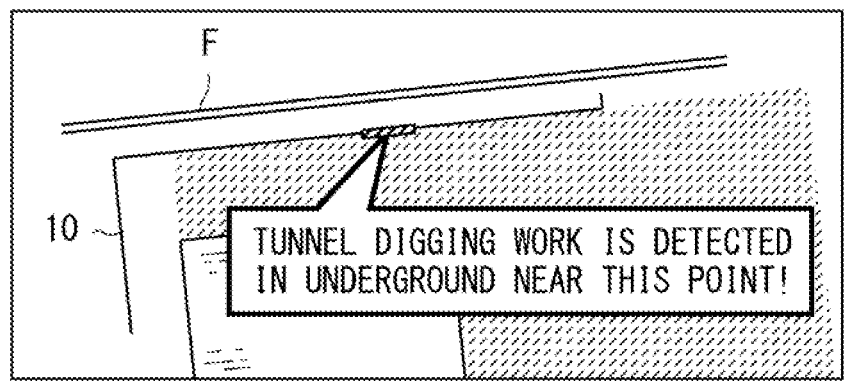
FIG. 17 shows an example of a GUI screen used for notification issued by a notification unit according to other example embodiments.

When the identifying unit 22 identifies a suspicious action in the underground G, the notification unit 28 may notify the occurrence position of the tunnel digging identified by the position identifying unit 26 and the exit position of the tunnel estimated by the estimation unit 27 regardless of the suspicious level. The notification destination and the notification method may be the same as those described above. At this time, the notification unit 28 may display the occurrence position of the tunnel digging and the exit position of the tunnel on the map when the notification is performed on the GUI screen. An example is shown in FIG. 17.

The optical fiber sensing equipment 20 is assumed to be installed in the underground G, but the present disclosure is not limited to this. Alternatively, the optical fiber sensing equipment 20 may be installed on the ground.

In the examples of FIGS. 1, 5, 7, 9, 11, 15, and 16, a plurality of components, i.e., the acquisition unit 21, identifying unit 22, the storage unit 23, the image acquisition unit 24, the image processing unit 25, the position identifying unit 26, the estimation unit 27, and the notification unit 28, are provided in the optical fiber sensing equipment 20, but the present disclosure is not limited to this. The components provided in the optical fiber sensing equipment 20 are not limited to being provided in one apparatus, and instead may be distributed in a plurality of apparatuses.

<Hardware Configuration of Optical Fiber Sensing Equipment>

Next, a hardware configuration of a computer 40 that implements the optical fiber sensing equipment 20 will be described with reference to FIG. 18.

Figure 18:
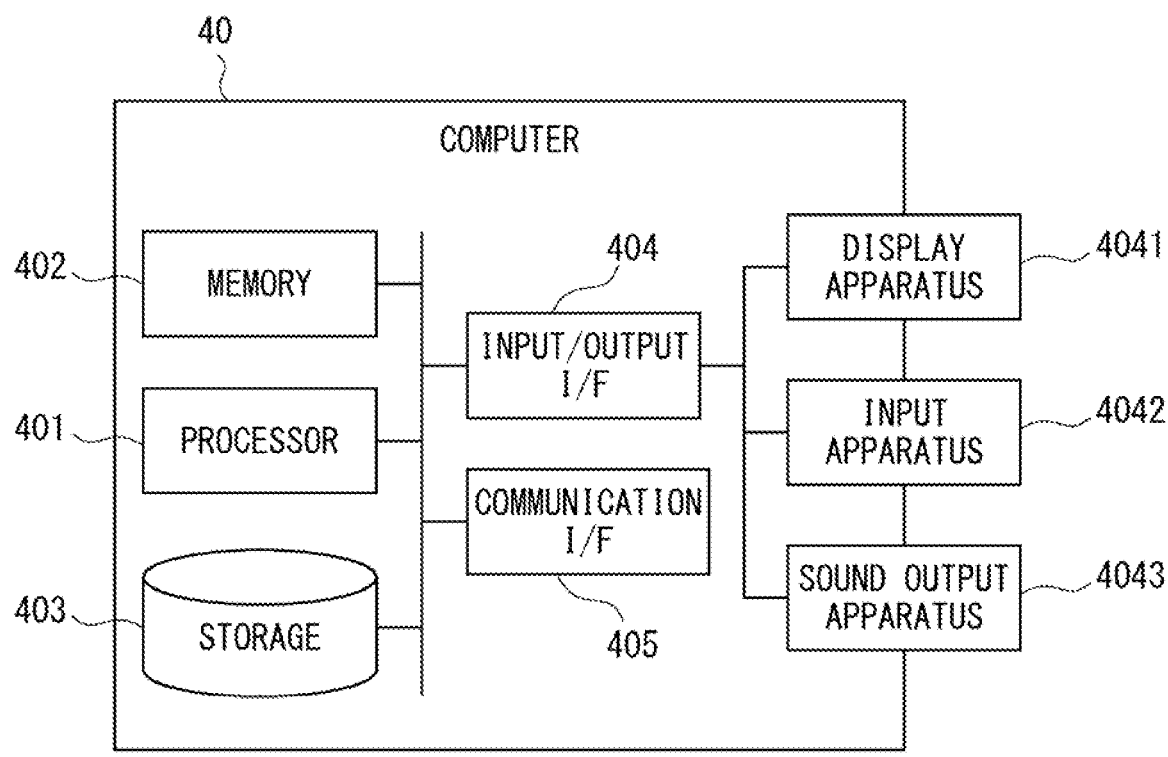
FIG. 18 is a block diagram showing an example of a hardware configuration of a computer for implementing optical fiber sensing equipment.

As shown in FIG. 18, the computer 40 includes a processor 401, a memory 402, a storage 403, an input/output interface (I/F) 404, a communication interface (I/F) 405, and the like. The processor 401, the memory 402, the storage 403, the input/output interface 404, and the communication interface 405 are connected by a data transmission path for transmitting and receiving data to and from each other.

The processor 401 is, for example, an arithmetic processing device such as a Central Processing Unit (CPU) or a Graphics Processing Unit (GPU). The memory 402 is, for example, a Random Access Memory (RAM) or a Read Only Memory (ROM). The storage 403 is, for example, a storage apparatus such as a Hard Disk Drive (HDD), a Solid State Drive (SSD), or a memory card. The storage 403 may be a memory such as RAM or ROM.

The storage 403 stores programs for implementing the functions of the components, i.e., the acquisition unit 21, the identifying unit 22, the image acquisition unit 24, the image processing unit 25, the position identifying unit 26, the estimation unit 27, and the notification unit 28, included in the optical fiber sensing equipment 20. The processor 401 implements the functions of the components of the optical fiber sensing equipment 20 by executing the respective programs. The processor 401 may execute the programs after reading the programs into the memory 402 or may execute the programs without reading the programs into the memory 402. The memory 402 and the storage 403 not only function as the storage unit 23, but also function to store information and data held by other components included in the optical fiber sensing equipment 20.

The above programs can be stored and provided to a computer including the computer 40 using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Compact Disc-ROM), CD-R (CD-Recordable), CD-R/W (CD-ReWritable), and semiconductor memories (such as mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

The input/output interface 404 is connected to a display apparatus 4041, an input apparatus 4042, a sound output apparatus 4043, etc. The display apparatus 4041 is for displaying a screen corresponding to drawing data processed by the processor 401, such as a Liquid Crystal Display (LCD), a Cathode Ray Tube (CRT) display, or a monitor. The input apparatus 4042 is for receiving an operator's operation input, and is, for example, a keyboard, a mouse, or a touch sensor. The display apparatus 4041 and the input apparatus 4042 may be integrated and implemented as a touch panel. The sound output apparatus 4043 is an apparatus such as a speaker that outputs sounds corresponding to sound data processed by the processor 401.

The communication interface 405 transmits and receives data to and from an external apparatus. For example, the communication interface 405 communicates with the external apparatus via a wired or wireless communication path.

Although the present disclosure has been described above with reference to the example embodiments, the present disclosure is not limited to the example embodiments described above. The configuration and details of the present disclosure may be modified in various ways that would be understood by those skilled in the art within the scope of the present disclosure.

For example, some or all of the above-described example embodiments may be used in combination with each other. For example, the methods for identifying a suspicious action in the underground G described in the above example embodiments may be used in combination with each other.

The whole or part of the example embodiments disclosed above can be described as, but not limited to, the following supplementary notes.

(Supplementary Note 1)

An optical fiber sensing system comprising:
  an optical fiber configured to detect a vibration in underground;
  an acquisition unit configured to acquire, from the optical fiber, an optical signal on which the vibration detected by the optical fiber is superimposed; and
  an identifying unit configured to identify a suspicious action in the underground based on a vibration pattern included in the optical signal acquired by the acquisition unit.

(Supplementary Note 2)

The optical fiber sensing system according to Supplementary note 1, wherein
  the identifying unit is configured to determine that the suspicious action has occurred in the underground when a periodic vibration is detected in the vibration pattern included in the optical signal and strength of the vibration gradually increases.

(Supplementary Note 3)

The optical fiber sensing system according to Supplementary note 1, further comprising:
  a storage unit configured to store in advance a vibration pattern of the vibration generated when the suspicious action occurs in the underground as a first vibration pattern, wherein
  the identifying unit is configured to determine, when the vibration pattern included in the optical signal acquired by the acquisition unit matches the first vibration pattern, the suspicious action corresponding to the first vibration pattern has occurred in the underground.

(Supplementary Note 4)

The optical fiber sensing system according to Supplementary note 3, wherein
  the storage unit is configured to store in advance a vibration pattern of a vibration generated when the underground is in a normal state as a second vibration pattern, and
  the identifying unit is configured to determine, when the vibration pattern included in the optical signal acquired by the acquisition unit is different from the second vibration pattern and matches the first vibration pattern, that the suspicious action corresponding to the first vibration pattern has occurred in the underground.

(Supplementary Note 5)

The optical fiber sensing system according to Supplementary note 3, wherein
  the optical fiber includes a first optical fiber disposed in the underground and a second optical fiber disposed on ground,
  the acquisition unit is configured to acquire, from the first optical fiber, an optical signal on which a vibration detected by the first optical fiber is superimposed, and acquire, from the second optical fiber, an optical signal on which a vibration detected by the second optical fiber is superimposed, and
  the identifying unit is configured to determine, when the vibration pattern included in the optical signal acquired from the first optical fiber by the acquisition unit includes vibration strength greater than that of the vibration pattern included in the optical signal acquired from the second optical fiber by the acquisition unit, and the vibration pattern included in the optical signal acquired from the first optical fiber by the acquisition unit matches the first vibration pattern, that the suspicious action corresponding to the first vibration pattern has occurred in the underground.

(Supplementary Note 6)

The optical fiber sensing system according to Supplementary note 3, further comprising:
  a camera configured to be capable of capturing a camera image of the ground;
  an image acquisition unit configured to acquire the camera image captured by the camera; and
  an image processing unit configured to detect the suspicious action from the camera image, wherein
  the identifying unit is configured to determine, when the vibration pattern included in the optical signal acquired by the acquisition unit matches the first vibration pattern, and the image processing unit cannot detect the suspicious action, that the suspicious action corresponding to the first vibration pattern has occurred in the underground.

(Supplementary Note 7)

The optical fiber sensing system according to any one of Supplementary notes 1 to 6, further comprising:
  a position identifying unit configured to identify a position where the suspicious action identified by the identifying unit has occurred based on the vibration pattern included in the optical signal acquired by the acquisition unit.

(Supplementary Note 8)

An optical fiber sensing equipment comprising:
  an acquisition unit configured to acquire an optical signal on which a vibration detected by an optical fiber is superimposed from the optical fiber for detecting the vibration in underground; and
  an identifying unit configured to identify a suspicious action in the underground based on a vibration pattern included in the optical signal acquired by the acquisition unit.

(Supplementary Note 9)

The optical fiber sensing equipment according to Supplementary 8, wherein
  the identifying unit is configured to determine that the suspicious action has occurred in the underground when a periodic vibration is detected in the vibration pattern included in the optical signal and strength of the vibration gradually increases.

(Supplementary Note 10)

The fiber sensing equipment according to Supplementary note 8, further comprising:
  a storage unit configured to store in advance a vibration pattern of the vibration generated when the suspicious action occurs in the underground as a first vibration pattern, wherein
  the identifying unit is configured to determine, when the vibration pattern included in the optical signal acquired by the acquisition unit matches the first vibration pattern, the suspicious action corresponding to the first vibration pattern has occurred in the underground.

(Supplementary Note 11)

The optical fiber sensing equipment according to Supplementary note 10, wherein
  the storage unit is configured to store in advance a vibration pattern of a vibration generated when the underground is in a normal state as a second vibration pattern, and
  the identifying unit is configured to determine, when the vibration pattern included in the optical signal acquired by the acquisition unit is different from the second vibration pattern and matches the first vibration pattern, that the suspicious action corresponding to the first vibration pattern has occurred in the underground.

(Supplementary Note 12)

The optical fiber sensing equipment according to Supplementary note 10, wherein
  the optical fiber includes a first optical fiber disposed in the underground and a second optical fiber disposed on ground,
  the acquisition unit is configured to acquire, from the first optical fiber, an optical signal on which a vibration detected by the first optical fiber is superimposed, and acquire, from the second optical fiber, an optical signal on which a vibration detected by the second optical fiber is superimposed, and
  the identifying unit is configured to determine, when the vibration pattern included in the optical signal acquired from the first optical fiber by the acquisition unit includes vibration strength greater than that of the vibration pattern included in the optical signal acquired from the second optical fiber by the acquisition unit, and the vibration pattern included in the optical signal acquired from the first optical fiber by the acquisition unit matches the first vibration pattern, that the suspicious action corresponding to the first vibration pattern has occurred in the underground.

(Supplementary Note 13)

The optical fiber sensing equipment according to Supplementary note 10, further comprising:
  an image acquisition unit configured to acquire a camera image captured by a camera capable of capturing the camera image of the ground; and
  an image processing unit configured to detect the suspicious action from the camera image, wherein
  the identifying unit is configured to determine, when the vibration pattern included in the optical signal acquired by the acquisition unit matches the first vibration pattern, and the image processing unit cannot detect the suspicious action, that the suspicious action corresponding to the first vibration pattern has occurred in the underground.

(Supplementary Note 14)

The optical fiber sensing equipment according to any one of Supplementary notes 8 to 13, further comprising:
  a position identifying unit configured to identify a position where the suspicious action identified by the identifying unit has occurred based on the vibration pattern included in the optical signal acquired by the acquisition unit.

(Supplementary Note 15)

An underground action monitoring method performed by an optical fiber sensing system, the underground action monitoring method comprising:
  detecting, by an optical fiber, a vibration in underground;
  acquiring, from the optical fiber, an optical signal on which the vibration detected by the optical fiber is superimposed; and
  identifying a suspicious action in the underground based on a vibration pattern included in the optical signal acquired in the acquiring.

(Supplementary Note 16)

The underground action monitoring method according to Supplementary note 15, wherein
in the identifying, it is determined that the suspicious action has occurred in the underground when a periodic vibration is detected in the vibration pattern included in the optical signal and strength of the vibration gradually increases.

(Supplementary Note 17)

The underground action monitoring method according to Supplementary note 15, further comprising:
storing in advance a vibration pattern of the vibration generated when the suspicious action occurs in the underground as a first vibration pattern, wherein
in the identifying, when the vibration pattern included in the optical signal acquired in the acquiring matches the first vibration pattern, it is determined that the suspicious action corresponding to the first vibration pattern has occurred in the underground.

(Supplementary Note 18)

The underground action monitoring method according to Supplementary note 17, wherein
in the storing, a vibration pattern of a vibration generated when the underground is in a normal state is stored in advance as a second vibration pattern, and
in the identifying, when the vibration pattern included in the optical signal acquired in the acquiring is different from the second vibration pattern and matches the first vibration pattern, it is determined that that the suspicious action corresponding to the first vibration pattern has occurred in the underground.

(Supplementary Note 19)

The underground action monitoring method according to Supplementary note 17, wherein
the optical fiber includes a first optical fiber disposed in the underground and a second optical fiber disposed on ground,
in the acquiring, an optical signal on which a vibration detected by the first optical fiber is superimposed is acquired from the first optical fiber, and an optical signal on which a vibration detected by the second optical fiber is superimposed is acquired from the second optical fiber, and
in the identifying, when the vibration pattern included in the optical signal acquired from the first optical fiber in the acquiring includes vibration strength greater than that of the vibration pattern included in the optical signal acquired from the second optical fiber in the acquiring, and the vibration pattern included in the optical signal acquired from the first optical fiber in the acquiring matches the first vibration pattern, it is determined that the suspicious action corresponding to the first vibration pattern has occurred in the underground.

(Supplementary Note 20)

The underground action monitoring method according to Supplementary note 17, further comprising:
acquiring a camera image captured by a camera capable of capturing the camera image of the ground; and
detecting the suspicious action from the camera image, wherein
in the identifying, when the vibration pattern included in the optical signal acquired in the acquiring matches the first vibration pattern, and the suspicious action cannot be detected in the acquiring of the camera image, it is determined that the suspicious action corresponding to the first vibration pattern has occurred in the underground.

(Supplementary Note 21)

The underground action monitoring method according to any one of Supplementary notes 15 to 20, further comprising:
identifying a position where the suspicious action identified in the identifying has occurred based on the vibration pattern included in the optical signal acquired in the acquiring.

REFERENCE SIGNS LIST 10A, 10A1, 10A2, 10B OPTICAL FIBER
20 OPTICAL FIBER SENSING EQUIPMENT
21 ACQUISITION UNIT
22 IDENTIFYING UNIT
23 STORAGE UNIT
24 IMAGE ACQUISITION UNIT
25 IMAGE PROCESSING UNIT
26 POSITION IDENTIFYING UNIT
27 ESTIMATION UNIT
28 NOTIFICATION UNIT
30 CAMERA
40 COMPUTER
401 PROCESSOR
402 MEMORY
403 STORAGE
404 INPUT/OUTPUT INTERFACE
4041 DISPLAY APPARATUS
4042 INPUT APPARATUS
4043 SOUND OUTPUT APPARATUS
405 COMMUNICATION INTERFACE
G UNDERGROUND
F FENCE

What is claimed is:

1. An optical fiber sensing system comprising:
an optical fiber configured to detect a vibration in underground;
an acquisition unit configured to acquire, from the optical fiber, an optical signal on which the vibration detected by the optical fiber is superimposed;
an identifying unit configured to identify a suspicious action in the underground based on a vibration pattern included in the optical signal acquired by the acquisition unit; and
a storage unit configured to store in advance a vibration pattern of the vibration generated when the suspicious action occurs in the underground as a first vibration pattern, wherein
the identifying unit is configured to determine, when the vibration pattern included in the optical signal acquired by the acquisition unit matches the first vibration pattern, the suspicious action corresponding to the first vibration pattern has occurred in the underground.

2. The optical fiber sensing system according to claim 1, wherein
the identifying unit is configured to determine that the suspicious action has occurred in the underground when a periodic vibration is detected in the vibration pattern included in the optical signal and strength of the vibration gradually increases.

3. The optical fiber sensing system according to claim 2, wherein
at least a part of the optical fiber is disposed in the underground, and
the acquisition unit is configured to acquire, from the optical fiber, an optical signal on which a vibration detected by the part of the optical fiber disposed in the underground is superimposed.

4. The optical fiber sensing system according to claim 1, wherein
the storage unit is configured to store in advance a vibration pattern of a vibration generated when the underground is in a normal state as a second vibration pattern, and
the identifying unit is configured to determine, when the vibration pattern included in the optical signal acquired by the acquisition unit is different from the second vibration pattern and matches the first vibration pattern, that the suspicious action corresponding to the first vibration pattern has occurred in the underground.

5. The optical fiber sensing system according to claim 1, wherein
the optical fiber includes a first optical fiber disposed in the underground and a second optical fiber disposed on ground,
the acquisition unit is configured to acquire, from the first optical fiber, an optical signal on which a vibration detected by the first optical fiber is superimposed, and acquire, from the second optical fiber, an optical signal on which a vibration detected by the second optical fiber is superimposed, and
the identifying unit is configured to determine, when the vibration pattern included in the optical signal acquired from the first optical fiber by the acquisition unit includes vibration strength greater than that of the vibration pattern included in the optical signal acquired from the second optical fiber by the acquisition unit, and the vibration pattern included in the optical signal acquired from the first optical fiber by the acquisition unit matches the first vibration pattern, that the suspicious action corresponding to the first vibration pattern has occurred in the underground.

6. The optical fiber sensing system according to claim 1, further comprising:
a camera configured to be capable of capturing a camera image of the ground;
an image acquisition unit configured to acquire the camera image captured by the camera; and
an image processing unit configured to detect the suspicious action from the camera image, wherein
the identifying unit is configured to determine, when the vibration pattern included in the optical signal acquired by the acquisition unit matches the first vibration pattern, and the image processing unit cannot detect the suspicious action, that the suspicious action corresponding to the first vibration pattern has occurred in the underground.

7. The optical fiber sensing system according to claim 1, further comprising:
a position identifying unit configured to identify a position where the suspicious action identified by the identifying unit has occurred based on the vibration pattern included in the optical signal acquired by the acquisition unit.

8. An optical fiber sensing equipment comprising:
an acquisition unit configured to acquire an optical signal on which a vibration detected by an optical fiber is superimposed from the optical fiber for detecting the vibration in underground;
an identifying unit configured to identify a suspicious action in the underground based on a vibration pattern included in the optical signal acquired by the acquisition unit; and a storage unit configured to store in advance a vibration pattern of the vibration generated when the suspicious action occurs in the underground as a first vibration pattern, wherein
the identifying unit is configured to determine, when the vibration pattern included in the optical signal acquired by the acquisition unit matches the first vibration pattern, the suspicious action corresponding to the first vibration pattern has occurred in the underground.

9. The optical fiber sensing equipment according to claim 8, wherein
the storage unit is configured to store in advance a vibration pattern of a vibration generated when the underground is in a normal state as a second vibration pattern, and
the identifying unit is configured to determine, when the vibration pattern included in the optical signal acquired by the acquisition unit is different from the second vibration pattern and matches the first vibration pattern, that the suspicious action corresponding to the first vibration pattern has occurred in the underground.

10. An underground action monitoring method performed by an optical fiber sensing system, the underground action monitoring method comprising:
detecting, by an optical fiber, a vibration in underground;
acquiring, from the optical fiber, an optical signal on which the vibration detected by the optical fiber is superimposed;
identifying a suspicious action in the underground based on a vibration pattern included in the optical signal acquired in the acquiring; and
storing in advance a vibration pattern of the vibration generated when the suspicious action occurs in the underground as a first vibration pattern, wherein
in the identifying, when the vibration pattern included in the optical signal acquired in the acquiring matches the first vibration pattern, it is determined that the suspicious action corresponding to the first vibration pattern has occurred in the underground.

11. The underground action monitoring method according to claim 10, wherein
in the storing, a vibration pattern of a vibration generated when the underground is in a normal state is stored in advance as a second vibration pattern, and
in the identifying, when the vibration pattern included in the optical signal acquired in the acquiring is different from the second vibration pattern and matches the first vibration pattern, it is determined that the suspicious action corresponding to the first vibration pattern has occurred in the underground.

12. The underground action monitoring method according to claim 10, further comprising:
acquiring a camera image captured by a camera capable of capturing the camera image of the ground; and
detecting the suspicious action from the camera image, wherein
in the identifying, when the vibration pattern included in the optical signal acquired in the acquiring matches the first vibration pattern, and the suspicious action cannot be detected in the acquiring of the camera image, it is determined that the suspicious action corresponding to the first vibration pattern has occurred in the underground.

* * * * *